United States Patent [19]

Lyon

[11] Patent Number: 5,509,362
[45] Date of Patent: Apr. 23, 1996

[54] METHOD AND APPARATUS FOR UNMIXED COMBUSTION AS AN ALTERNATIVE TO FIRE

[75] Inventor: Richard K. Lyon, Pittstown, N.J.

[73] Assignee: Energy and Environmental Research Corporation, Irvine, Calif.

[21] Appl. No.: 270,157

[22] Filed: Jun. 30, 1994

Related U.S. Application Data

[63] Continuation-in-part of Ser. No. 990,880, Dec. 11, 1992, Pat. No. 5,339,754.

[51] Int. Cl.⁶ ........................................... F23J 11/00
[52] U.S. Cl. .......................... 110/345; 110/346; 110/237
[58] Field of Search ................................ 110/342, 345, 110/246, 346; 423/213.2, 245.3; 588/202

[56] References Cited

U.S. PATENT DOCUMENTS

| | | | |
|---|---|---|---|
| 1,973,590 | 9/1934 | Weaton et al. | 110/342 |
| 4,388,877 | 6/1983 | Molayem et al. | 110/342 |
| 4,400,356 | 8/1983 | McVay et al. | 422/171 |
| 5,130,100 | 7/1992 | Serizawa | 422/180 |

OTHER PUBLICATIONS

Bhattacharyya, et al., Catalytic Sox Abatement of FCC Flue Gases, Preprints of Papers Presented at the 194th National Meeting of the American Chemical Society, vol. 32, No. 4, Aug. 31–Sep. 4, 1987.

Lemieux, et al. Minimization of Transient Emissions From Rotary Kiln Incinerators, Prepared for Submission to Combustion Science and Technology, Aug. 2, 1989, (Revised Jan. 5, 1990).

Shale, Amonia Injection: A Route to Clean Stacks, Advances in Chemistry Series 127, American Chemical Society, Washington, D.C., (1973).

Chemical Abstracts, vol. 100, p. 174, 1984.

Ishida, M. et al. Evaluation of a Chemical–Looping–Combusion Power–Generation System by Graphic Exergy Analysis, Energy, vol. 12, No. 2, pp. 147–154, 1987.

Lyon, Richard K., Unmixed Combustion: A New Technology for Prevention of Puffing by Rotary Kiln Incinerators and Other Applications, American Chemical Society, vol. 38, No. 2, Preprints of Papers Presented at the 205th ACS National Meeting in Denver, CO, Mar. 28–Apr. 2, 1993.

Wendt, et al., Prediction of Transient Behavior During Batch Incineration of Liquid Wastes in Rotary Kiln, Hazardous Waste & Hazardous Materials, vol. 7, No. 1, Mary Ann Liebert, Inc., Publishers.

Wendt, et al., Mechanisms Governing Transients from the Batch Incineratio of Liquid Waters in Rotary Kiln, Combustion Science and Technology, 1988, vol. 61, pp. 169–185.

Richter, H. J. et al., *Reversibility of combustion Processes*, Second Law Analysis of Processes, ACS Symposium Ser. 235, pp. 71–86 (1983).

*Primary Examiner*—Henry A. Bennet
*Assistant Examiner*—Susanne C. Tinker
*Attorney, Agent, or Firm*—Workman, Nydegger & Seeley

[57] ABSTRACT

Methods and apparatus are provided for combustion systems wherein fuel may be burned completely with use of air as the oxidant, without the necessity for completely mixing the fuel with the air before, during, or after the combustion process. A bed of readily reducible metal oxide, the reduced form of this metal oxide being readily oxidized, is placed within a combustion system. The air and fuel are contacted with the bed at an elevated temperature, with the metal oxide oxidizing the fuel and being regenerated by the air. In one embodiment, complete combustion of fuel occurs without complete mixing of fuel and air. In other embodiments fuel can be burned with little or no mixing with a the combustion process, or fuel can be burned with little or no mixing with air, before, during, or after the combustion process, thereby avoiding a number of disadvantages of such mixing.

14 Claims, 16 Drawing Sheets

5,509,362

METHOD AND APPARATUS FOR UNMIXED COMBUSTION AS AN ALTERNATIVE TO FIRE

BACKGROUND

The present application is a continuation-in-part of U.S. application Ser. No. 07/990,880 entitled "Method and Apparatus for Prevention of Puffing by Rotary Kiln and Other Incinerators and Combustion Systems," filed Dec. 11, 1992, which issued as U.S. Pat. No. 5,339,754.

1. Field of the Invention

The invention relates generally to apparatus and methods for oxidizing fuels in combustion systems without the necessity of mixing the fuel with air. More particularly, the invention is directed to methods and apparatus for oxidizing fuel without mixing the fuel with air in those situations in which the mixing is either disadvantageous or difficult to achieve.

2. The Relevant Technology

Historically, the chief method by which mankind has used fuel to generate heat has been by fire. As a technology, however, fire has a number of disadvantages. The burning of fuel by means of fire produces the air pollutant $NO_x$. Since using fire necessarily involves mixing fuel with air before or during combustion, the products of combustion from fire are necessarily diluted with large amounts of nitrogen. This makes the recovery of air pollutants such as $SO_2$, $CO_2$, Hg, HCl, HF and particles containing toxic metals more difficult because of the larger volume of gas which must be treated. Furthermore, the dilution of the combustion products with nitrogen lowers the dew point of the water vapor in the combustion gases, making useful recovery of the heat of vaporization of the vapor more difficult.

Fire has the further disadvantage that the heat of combustion of the fuel is initially liberated in the gas phase. The coefficient of heat transfer between flowing gases and solid surfaces is relatively low. Thus, for example in steam boilers, fuel is burned in air to produce hot gases which are then flowed past tubes through which water is flowed. To compensate for the low coefficient of heat transfer from the hot gas to the tubes, the tubes are given a very large surface area. This large surface area is expensive and greatly adds to the cost of raising steam for electricity generation and other purposes.

Fire also has the disadvantage that many industrial processes require supplying heat to the interior of a packed bed reactor and supplying this heat with fire can involve a difficult and expensive heat transfer operation. Fire also has the limitation of being a nonselective process, i.e. if one had a mixture of oxidizable materials and wished to completely oxidize some of them while limiting the extent to which others are oxidized, this would be difficult to do with fire.

All of the disadvantages of fire discussed above relate to the fact that fire, when supported by air, involves mixing the fuel with air. A second kind of disadvantage of fire involves the fact that for a fire to produce complete oxidation of the fuel, the fuel must be completely mixed with an at least stoichiometric quantity of air. This requirement is a major drawback in that there are a number of combustion systems in which such mixing is quite difficult to provide. Thus, for example, the incinerators most commonly used to incinerate hazardous waste are rotary kiln incinerators which have great difficulty providing complete mixing.

Specifically it is to be noted that the United States currently produces 265 million tons of hazardous waste per year. In most instances the toxicity of this waste comes from toxic organic materials which, in principle, can be completely destroyed by incineration. In contrast to incineration, all other disposal technologies involve the risk that some of the toxic materials will return to the environment. Thus, incineration is the ideal solution to the problem of waste disposal.

Available incinerator technology, however, is subject to a number of limitations. One of the most important of these limitations is the occasional emission of toxic organic materials into the environment by rotary kiln incinerators. This problem, referred to as "puffing," is serious within the incineration field, since rotary kiln incinerators are a substantial fraction of the total United States incineration capacity.

A combustion system can fail to achieve complete combustion in two entirely different ways. One way is for fluctuations to occur so that occasionally some of the air/fuel mixture does not contain enough air for complete combustion and as a result combustible materials are "puffed" into the environment. The other way is for the temperature to be so low that the chemical reaction of combustion is slow and fails to go to completion. Because fluid bed combustors can operate at much lower temperatures than most other combustion systems, incomplete combustion due to low temperature is a significant problem for them.

The severity of an incinerator's puffing problems depends upon a number of parameters: the rate of radiative heat transfer, the rate at which fresh surface is exposed, the frequency at which slugs of material capable of forming puffs are added to the incinerator, and the size of those slugs. The latter two parameters are directly controllable while the former two are partially controllable by changing operating parameters such as the rate of rotation. Thus, while it is possible for an incinerator to manage puffing problems, this means operating the incinerator at a capacity that is less than the capacity it would have if puffing were not a problem.

Rotary kiln incinerators handle both solid and liquid wastes. For combustible liquid wastes the practice is to mix the liquid waste with a sorbent, which is then placed in a container (typically a cardboard, plastic, or steel drum), and fed to the rotary kiln incinerator. These large closed containers are heated until the vapor pressure of the liquid is sufficient to cause them to rupture. This results in a sudden discharge of a large amount of combustible vapors into the incinerator.

Often, when this sudden discharge occurs, the supply of combustion air within the incinerator can be much less than sufficient for complete oxidation of these suddenly released vapors. This can cause substantial amounts of these toxic organic vapors to be discharged from the incinerator into the environment without first being oxidized.

A problem very similar to puffing is likely to occur during the United States Army's planned disposal of its chemical weapons. The bulk of this inventory consists of weapons that contain nerve agents but the inventory also includes weapons containing Lewisite and mustard gas. While the discussion that follows is given in temps of the weapons that contain nerve agents, it is equally applicable to the Lewisite and mustard gas containing weapons.

It has been determined that for some types of these weapons, the nerve agent is slowly eating its way out of munitions containers to produce "leakers," and that the energetic materials therein will detonate once old enough. Generally, the Army's plan of disposal of nerve agent mines and other chemical agent munitions consists of bringing munitions into a negative pressure building and unpacking the munitions, with the packing material going to a dunnage incinerator. Some of these munitions (i.e., the bombs and ton containers) do not contain energetic materials. The nerve agents are drained from these munitions and sent to a liquid incinerator, and the empty munitions go to another incinerator, the metal parts furnace.

Other munitions, such as rockets, mines and shells, do contain energetic materials. These energetic materials are decades old and in some instances their stability is questionable. Nevertheless, these old explosives must be handled, taken out of the rocket, mine, or shell, and sent to another incinerator, the "deactivation furnace system." Following this, rockets, mines, and shells are drained of their chemical agent, with the agent again going to the liquid incinerator and the empty munitions going to the metal pans furnace.

Thus, the incineration system the Army presently plans to build involves unpacking these overage munitions, removing whatever explosive materials they contain, and draining them of nerve agent. The Army plans to disassemble the nerve agent munitions and burn them in four separate incinerators, one for the nerve agents themselves, one for the explosive components of the munitions, one to melt all the metal pans into a mostly aluminum slag, and one to dispose of the packing material. The safety problems involved in doing this much handling are large and expensive to solve. The disposal of these munitions is expected to cost billions of dollars.

GA Technologies has done an analysis of the risks involved in the disposal of these weapons. In this analysis, the greatest risk in disposing of the weapons was found to be the accidental feeding of a mine or other munitions, which had not been emptied of its nerve agent, into the packing material incinerator. The nerve agent contained within the mine would suddenly be vaporized within the incinerator, thereby causing a nearly instantaneous release of combustible organic vapor into the incinerator. The supply of combustion air would not be nearly adequate for complete combustion of this nerve agent, and so the nerve agent would be released in an unoxidized state. Up to 15 pounds of nerve agent could be released to the atmosphere in a puff.

GA Technologies estimated the probability for this accident at 0.01 per year per site, and the Army's present plans call for building nine facilities of this general design. The Army regards the risk of discharging 15 pounds of nerve gas to the environment as marginally acceptable since the probability of the event is not high and the amount of nerve gas released small enough that casualties in the downwind civilian population are unlikely. Since there are nine sites planned, and the destruction of the munitions will require a number of years, the probability of such an accident happening at least once is significant.

Generally, incinerators are evaluated in terms of the fraction of the input organic which they destroy, i.e., the destruction and removal effectiveness (DRE). Despite their tendency to occasionally puff, most rotary kiln incinerators achieve a sufficiently high DRE on average so that their operations are at least marginally acceptable from an environmental viewpoint.

Regulations regarding the operation of incinerators are written in terms of the DRE, and typically their requirement for the DRE average is 99.99%. For incinerators that handle extremely toxic materials, a DRE of 99.9999% is sometimes required. This requirement, however, relates to the DRE measured as a rolling average over a period of time. Thus, a technology that eliminates puffs need not itself be 99.99% effective in order to be satisfactory. It is sufficient that the incinerator using this technology have a DRE of 99.99% or 99.9999% on a time average basis. Hence, in most situations in which puffing is a problem, a technology which decreases the size of the puff being emitted to the atmosphere by a factor of 10 to 100 would be satisfactory.

Such a technology will be useful only if it has sufficient capacity. For the sake of a numerical example, a puff control device with a residence time of 0.5 seconds at a temperature of 800° C. should be considered, this device treating a puff of toluene having a median height of 5000 ppm and a duration of 34 seconds. Oxidizing one mole of toluene requires 11 moles of oxygen or 55 moles of air. Consequently to completely oxidize the puff in this example the device would need a capacity equivalent to 18.7 cc of air per cc of the devices' volume.

As another example, 15 pounds of the nerve agent GB ($C_4H_{10}FO_2P$) is suddenly introduced to a 5 megawatt incinerator using combustion air at 4.66 pounds per second. This corresponds to 0.16 pound moles of air per second and 0.107 pound moles of GB. Oxidation of 0.107 pound moles of GB will require 3.48 pound moles of air. Since the gas passing through the puffing control device has a residence time of 0.5 seconds, the device has a volume sufficient to hold 0.08 pound moles of air. Thus, to completely oxidize the nerve gas the device would need a capacity equivalent to 3.48/0.08 or 43.5 cc of air per cc of the device's volume.

Prior combustion devices have been developed in which the combustion of fossil fuels is carried out in a fluidized bed in the presence of a solid sulfur oxide adsorbent and a metal or metal oxide component, which is catalytically active with respect to unburned hydrocarbons, carbon monoxide, and nitrogen oxide. Fixed bed catalysts particularly adapted for use in wood and coal burning stoves have also been developed in the past. Exhaust gas cleaning devices have been constructed which carry an exhaust gas cleaning catalyst such as platinum, palladium or rhodium. None of these devices, however, address the puffing problems that occur in waste disposal incinerator systems.

It is well known that natural gas, oil, coal, other fossil fuels, and wood are quite different from waste in that natural gas, oil, coal, other fossil fuels, and wood are all fuels with well defined properties. These well defined properties allow them to be fed to an appropriate combustion system in such a manner that complete mixing and hence complete combustion can be achieved.

Waste, however, is a highly inhomogeneous material. When waste is fed to a combustion system, sometimes the waste will be completely noncombustible and sometimes it will contain a high percentage of extremely flammable materials. For such a material, is difficult to provide complete mixing with stoichiometric quantities of air and hence difficult to achieve complete combustion. The combustion system most commonly used to incinerate waste is the rotary kiln, because rotary kilns minimize this problem though they do not completely solve it. As a result, rotary kiln incinerators do have occasions in which the supply of fuel exceeds the instantaneous supply of air and puffing occurs.

SUMMARY OF THE INVENTION

A principle object of the present invention is to provide a method and apparatus for completely oxidizing fuel for highly inhomogeneous fuels for which complete mixing with stoichiometric quantities of air is not readily achieved.

Another object of the invention is to provide methods and apparatus for oxidizing fuel in combustion systems whereby obsolete chemical munitions can be disposed of by the United States Army and other foreign armies without the high risk of discharging nerve agent or other toxic compounds to the environment.

Yet another object of the invention is to provide methods and apparatus for oxidizing fuel in combustion systems whereby obsolete explosives and other munitions can be disposed of with greatly reduced discharge of carbon monoxide and $NO_x$ to the environment.

Still another object of the invention is to provide a method and apparatus for preventing puffing by rotary kiln incinerators and other similar incinerators.

A further object of the invention is to provide a novel combustion system wherein the fuel is oxidized without mixing with air.

Still another object of the invention is to provide a novel combustion system wherein $NO_x$ production is suppressed.

An additional object of the invention is to provide a novel combustion system wherein the dilution of combustion products with nitrogen is avoided, allowing the emissions of air pollutants such as $SO_2$, $CO_2$, HCl, HF and toxic heavy metals to be controlled in a less expensive manner.

Still another object of the present invention is to provide a novel combustion system wherein the dilution of combustion products with nitrogen is avoided, thereby raising the dew point of the post combustion gases and allowing the heat of vaporization of the water vapor produced in the combustion process to be usefully recovered.

An additional object of the invention is to provide a novel combustion system for producing nitrogen gas.

Another object of the invention is to provide a novel combustion system providing a more rapid transfer of the heat liberated by the combustion process to heat exchange tubes and other solid surfaces.

Still another object of the invention is to provide a novel combustion system providing a more rapid transfer of the heat liberated by the combustion process to a packed bed reactor.

Another object of the invention is to provide a novel combustion system with which a mixture of different oxidizable materials can be oxidized, the oxidation of some of these materials being taken to completion while other are not.

Additional objects and advantages of the invention will be set forth in the description which follows, or may be learned by the practice of the invention. The objects and advantages of the invention may be realized and obtained by means of the instruments and combinations particularly pointed out in the appended claims.

To achieve the foregoing objects, and in accordance with the invention as embodied and broadly described herein, methods and apparatus have been developed whereby fuel is oxidized without the necessity of mixing the fuel with air, thereby avoiding puffing in rotary kiln systems and providing other advantages in other combustion systems. Thus, the invention is a novel combustion method and system with many possible applications.

Generally, combustion air passes through incinerators as fast as the air is supplied. Therefore, when organic matter enters the combustion chamber in slugs rather than in small amounts, there is no extra combustion air with which to oxidize the sudden slugs of organic matter. When this occurs the organic matter is discharged into the environment unoxidized and usually highly toxic. The present invention provides methods and apparatus that prevent this discharge into the environment of the unoxidized material by providing a supply of oxygen that can oxidize the unoxidized material.

The invention includes a method of oxidizing fuel to control puffing in a combustion device such as in a rotary kiln incinerator, in which the rate at which the fuel is fed is irregular, causing the ratio of fuel to air to fluctuate in space or time. The fluctuations on some occasions are large enough so that portions of a fuel and air mixture do not contain enough air for complete combustion, and as a result, combustible materials are emitted to the environment.

The combustion device is provided with an oxidizing means for supplying a readily reducible metal oxide, with the reduced form of this metal oxide being readily oxidized. The amount of readily reducible metal oxide which the oxidizing means provides is controlled with respect to the size of the fluctuations of fuel and air so as to provide a reservoir of oxygen sufficient for complete oxidation. The fuel and air mixture is passed at an elevated temperature through the oxidizing means such that any portion of the fuel and air mixture that does not contain sufficient air for complete oxidation of the fuel can react with the oxidizing means, and thereby be completely oxidized. Thus, as the metal oxide is reduced, the unoxidized fuel is oxidized. Later, air reoxidizes the metal to metal oxide and the metal oxide can be used again.

The amount of oxygen the oxidizing means can supply is preferably controlled relative to the fluctuations of fuel and air by measuring or estimating the puff emitted by an incinerator, installing a bed containing enough oxidizing agent to completely oxidize the compounds in the puff, and as the bed wears out the bed can be replaced or more oxidizing agent can be added. Rotary kiln incinerators and other incinerators will be discussed as examples of combustion systems within the scope of the present invention.

The present invention also includes a method and system for burning fuel in a combustion system, in which a combustion device is provided including means for maintaining fuel and air largely unmixed before and during combustion, such that mixing of the fuel and the air before and during combustion is largely avoided. The combustion device comprises oxidizing means for supplying a reducible metal oxide so as to provide a reservoir of oxygen to oxidize the fuel. Means are also provided for contacting an amount of the fuel and an amount of the air alternately with the oxidizing means, the amount of the fuel being less than that which would be required to completely reduce the metal oxide to metal, and the amount of the air being at least sufficient for complete oxidation of the amount of the fuel. In an alternate embodiment of the above method and system, means are provided for maintaining the fuel and the air largely unmixed before, during, and after combustion.

The present invention provides, in effect, a reservoir of combustion air which can be utilized when the sudden bursts of unoxidized fuel arise. In the present invention, copper oxide supported on high surface area alumina is one preferred metal oxide. The copper oxide, or other readily reducible metal oxide, can be placed into combustion systems in three forms: as a fixed bed of individual metal oxide particles; a fluid bed of individual metal oxide particles; or as a monolith honeycomb structure having channels formed therethrough for passage of the air and fuel mixtures. The step of passing the fuel and air mixture, at elevated temperatures, through the oxidizing means may transpire either within the region of greatest heat release within the combustion device, or downstream of the region of the greatest heat release.

An additional embodiment of the invention provides combustion methods and systems in which obsolete chemical munitions can be disposed of without the high risk of discharging nerve agent or other toxic compounds to the environment. In other embodiments of the invention, methods and apparatus are provided for novel combustion systems in which fuel is oxidized without being mixed with air, whereby $NO_x$ production is suppressed, and the emissions of $SO_2$, $CO_2$, Hg, HCl, HF, and/or particles containing toxic metals are controlled.

In additional embodiments, methods and apparatus are provided in which nitrogen gas is produced, and low $NO_x$ combustion of high nitrogen fuels is accomplished. In further embodiments, heat is transferred more efficiently to heat exchange tubes and other solid surfaces, heat is transferred more efficiently to packed bed reactors, the heat of vaporization of water vapor produced by combustion is recovered at a temperature high enough to allow the economical use of the heat, and some components in a mixture are allowed to be completely oxidized while others are not.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are therefore not to be considered limiting of its scope, the invention will be described with additional specificity and detail through the use of the accompanying drawings in which.

DETAILED DESCRIPTION OF THE INVENTION

Figure 1:
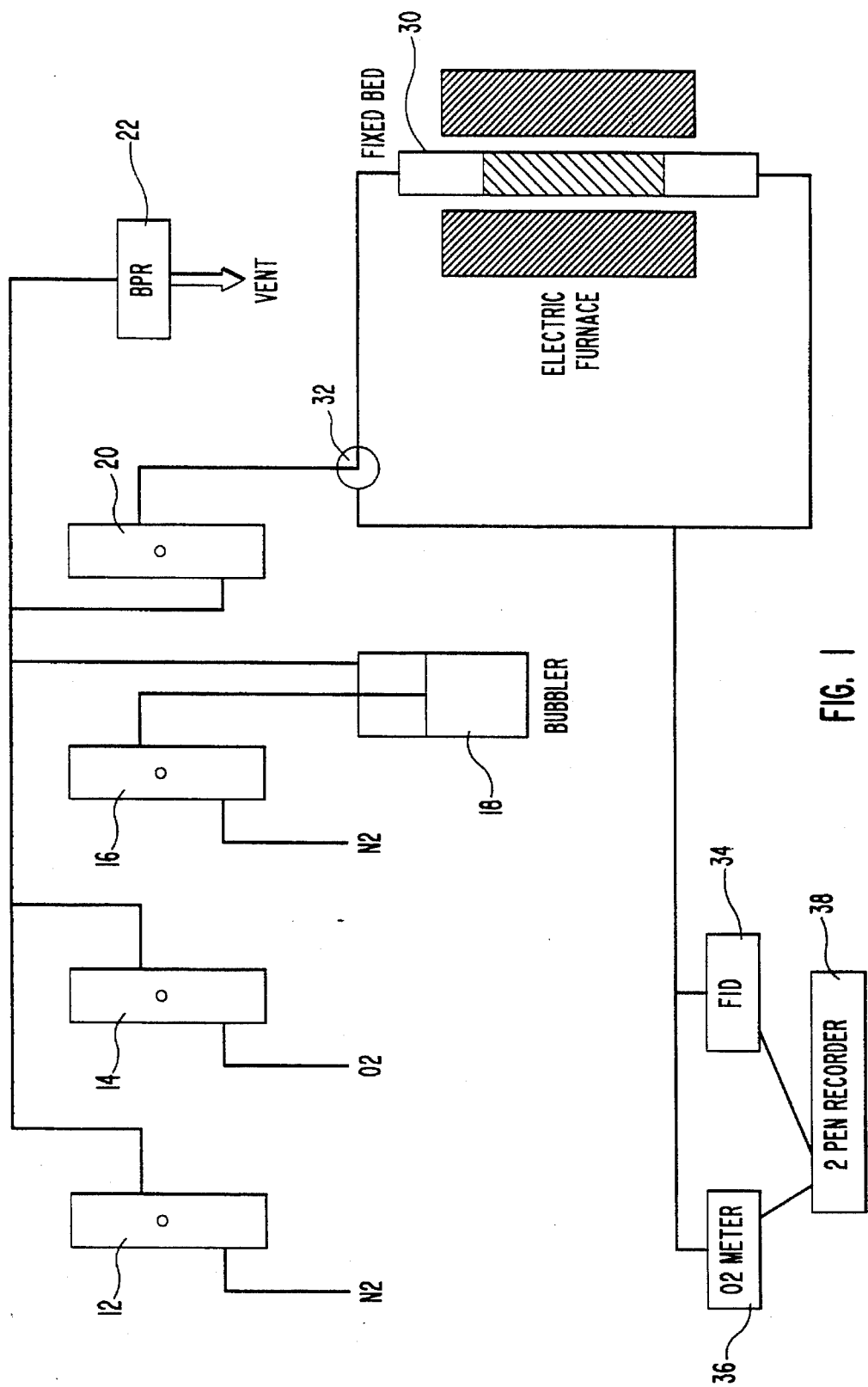
FIG. 1 illustrates an experimental setup using a fixed bed of reducible metal oxide to oxidize organic compounds.

The present invention relates to methods and apparatus for reducing the need to provide complete mixing of fuel and air in order to achieve complete oxidation of the fuel in combustion systems such as rotary kiln incinerators. Additionally, the present invention relates to combustion systems in which fuel is oxidized without being mixed with air, whereby $NO_x$ production is suppressed, and the emissions of $SO_2$ $CO_2$, Hg, HCl, HF, and/or particles containing toxic metals are more readily controlled. The invention also relates to combustion systems in which nitrogen gas may be produced, high nitrogen fuels may be combusted with low $NO_x$ emissions, and heat can be transferred more efficiently to heat exchange tubes and other solid surfaces. The invention also relates to combustion systems wherein heat can be transferred more efficiently to packed bed reactors, the heat of vaporization of water vapor produced by combustion can be recovered at a temperature high enough to allow the economical use of the heat, and some components in a mixture can be completely oxidized while others are not. The invention further relates to methods and apparatus for oxidizing fuel in combustion systems wherein obsolete chemical munitions can be disposed of without the high risk of discharging nerve agent or nitrogen compounds to the environment.

Although all combustion systems, in which it is difficult to achieve the complete mixing of fuel with stoichiometric air necessary for complete combustion, may be within the scope of the present invention, for the sake of clarity and example, rotary kiln and other incinerators will be discussed below. Similarly, all combustion systems in which the mixing of the fuel with air results in a disadvantage may be within the scope of the instant invention, but the instant invention is not limited to those examples of this disadvantage that are discussed below.

A. Mass Transfer Catalysis vs. Chemical Reaction Catalysis

The present invention is directed to methods and apparatus for effecting oxidation without the necessity of providing complete mixing with stoichiometric quantities of air. It is a feature of the present invention to use a mass transfer catalyst to oxidize fuel.

Mass transfer catalysis should be considered in contrast to the common chemical reaction catalysis such as exemplified by the pollution control systems used in automobiles. The exhaust coming out of the engine contains CO and unburned hydrocarbons. Air is added to this exhaust which is passed through a noble metal catalyst. The amount of air added needs to be accurately controlled. If too much cold air is added the temperature of the air/exhaust gas mixture will be too low and the catalyst will not be able to cause complete reaction. On the other hand if too little air is added it will not be sufficient for complete reaction oft he CO and unburned hydrocarbons, and some of these will be discharged to the atmosphere unoxidized.

The noble metals of iridium, platinum, and palladium, are some of the most effective catalysts for the chemical reaction of oxidation. These noble metals are inert and indeed this inertness is the reason they are given the name "noble".

Thus, when air and exhaust gas are passed through a noble metal catalyst, the noble metal promotes the oxidation reaction but it does not store oxygen. If at any instant the air supplied is not adequate for complete combustion, the combustion will be incomplete.

Unlike chemical reaction catalysts, a mass transfer catalyst facilitates the mass transfer of a reactant, an entirely different type of action. The present invention utilizes a mass transfer catalyst to oxidize fuel in various combustion systems, i.e. the present invention uses a readily reduced metal oxide to remove oxygen from air and supply it to the fuel. The preferred metal oxides for the present invention are the oxides of silver, copper, iron, cobalt, nickel, tungsten, manganese, molybdenum, and mixtures thereof. The preferred temperature range for silver oxide is about 300° C. to 700° C.; for copper oxide, about 500° C. to 1000° C.; for iron, cobalt, and nickel oxides, and mixtures thereof, about 700° C. to 1100° C; and for tungsten, manganese, and molybdenum oxides, and mixtures thereof, about 800° C. to 1200° C.

B. Rotary Kiln and Other Incinerators

Combustion air is supplied to incinerators as a continuous flow. Therefore, when organic matter enters the combustion chamber in slugs rather than continuously, there may not be enough combustion air with which to oxidize the sudden slugs of organic matter. When this occurs the organic matter is discharged or "puffed" into the environment unoxidized and usually highly toxic. The present invention provides methods and apparatus that prevent this discharge into the environment of the unoxidized material by providing a supply of oxygen which can oxidize the unoxidized material. Thus, the invention provides solutions to problems of puffing by rotary kiln and other incinerators resulting from the fact that organic matter sometimes goes into the combustion chamber in slugs and a conventional incinerator does not maintain an inventory of combustion air with which to oxidize these slugs of organic matter.

The invention includes a method of oxidizing fuel in a combustion device to control puffing, such as in a rotary kiln incinerator, in which the rate at which the fuel is fed is irregular, causing the ratio of fuel to air to fluctuate in space or time. The fluctuations on some occasions are large enough so that portions of a fuel and air mixture do not contain enough air for complete combustion, and as a result, combustible materials are emitted to the environment.

The present invention provides within the combustion device an oxidizing means for supplying a readily reducible metal oxide under the conditions of the combustion system, with the reduced form of this metal oxide being readily oxidized so as to regenerate the oxidized form for reuse. The amount of readily reducible metal oxide which the oxidizing means provides is controlled with respect to the size of the fluctuations of fuel and air so as to provide a reservoir of oxygen sufficient for complete oxidation. The fuel and air mixture is passed at an elevated temperature through the oxidizing means such that any portion of the fuel and air mixture that does not contain sufficient air for complete oxidation of the fuel can react with the oxidizing means, and thereby be completely oxidized. Thus, as the metal oxide is reduced, the unoxidized fuel is oxidized. Later, air reoxidizes the metal to metal oxide and the metal oxide can be used again.

The action of controlling the amount of oxygen the oxidizing means can supply so that it is big enough to take care of the puffs is performed prior to installation of the oxidizing means in an incinerator. The amount of oxygen the oxidizing means can supply is preferably controlled relative to the fluctuations of fuel and air by measuring the puff emitted by an incinerator, installing a bed containing enough oxidizing agent to completely oxidize the compounds in the puff, and as the bed wears out the bed can be replaced or more oxidizing agent can be added. This controlling action is necessary for combustion systems in which substantial fluctuations occur since if the oxidizing agent cannot provide enough oxygen for complete oxidation some of the fuel will not be oxidized.

The step of passing the fuel and air mixture, at elevated temperatures, through the oxidizing means may transpire either within the region of greatest heat release within the combustion device, or downstream of the region of the greatest heat release.

The present invention provides, in effect, a reservoir of combustion air which can be utilized when the sudden bursts of unoxidized fuel arise. In the instant invention the rotary kiln or other incinerator is operated in conventional fashion except that the oxidizing means for supplying a readily reducible metal oxide is provided within the incinerator. The gases coming out of the kiln are passed at elevated temperatures through this oxidizing means. As the gases pass therethrough, any unoxidized gases react with the readily reducible metal oxide of the oxidizing means such that the gasses are completely oxidized.

In a method of the present invention, once the oxidizing means is placed within the combustion system, gases are flowed through the oxidizing means at elevated temperatures of preferably greater than about 300° C. and less than about 1200° C. The temperatures are even more preferably within the range of about 500° C. to about 1,000° C., and most preferably within the range of about 700° C. to about 1,000° C.

The residence time of the gas passing through the oxidizing means should be equal to or greater than 0.01 second. The residence time is more preferably equal to or greater than 0.1 second, and most preferably within the range of about 0.1 to about 2.0 seconds.

The metal oxide particles can be placed within the combustion system either as the bulk oxide, the bulk metal which will then oxidize, or as the oxide or oxide precursor supported on a high surface area refractory material such as aluminum oxide (alumina). These may be used as a static packed bed or in a fluid bed. Alteratively, the high surface area alumina or other refractory material could be used as a monolith, that is, porous alumina may be fabricated into a shape resembling a honeycomb rather than a bed of individual particles. This honeycomb shape is then impregnated with a reducible metal oxide. The honeycomb has channels through which the air and fuel or other organic gases may pass.

In one preferred embodiment, the reducible metal oxide comprises a bed of copper oxide and a high surface area support for the metal oxide comprises individual alumina particles. Organic matter passing through copper oxide at elevated temperatures is rapidly oxidized and the copper oxide is reduced to copper. The copper rapidly reoxidizes to copper oxide on exposure to air. Thus, the copper oxide can provide a reservoir of stored oxygen adequate to oxidize puffs of organic vapors which would otherwise escape. Other possible metal oxides that may be used include iron oxide, cobalt oxide, nickel oxide, and tungsten oxide.

The catalytic device of the present invention containing the oxidizing agent can be positioned relative to a rotary kiln or other incinerator in a variety of ways. It is well within the skill of the art to locate the catalytic device in a number of different locations, depending on what is convenient to a particular user's circumstances. One possibility is to put the catalytic device at the outlet of the kiln, the temperature there typically being high enough for the catalyst to be effective. Another possibility is to place the catalyst at the outlet of the afterburner, this also being a location that could provide a suitable temperature.

C. Low $NO_x$ Combustion

In another embodiment, the present invention is a method of burning fuel with greatly reduced production of $NO_x$ compared to conventional combustion systems. Whereas in conventional combustion systems the fuel and air are mixed either before or during combustion, in this embodiment of the present invention, the fuel and air either are never mixed or are mixed only after they have passed the oxidizing means for supplying a readily reducible metal oxide.

Figure 8:
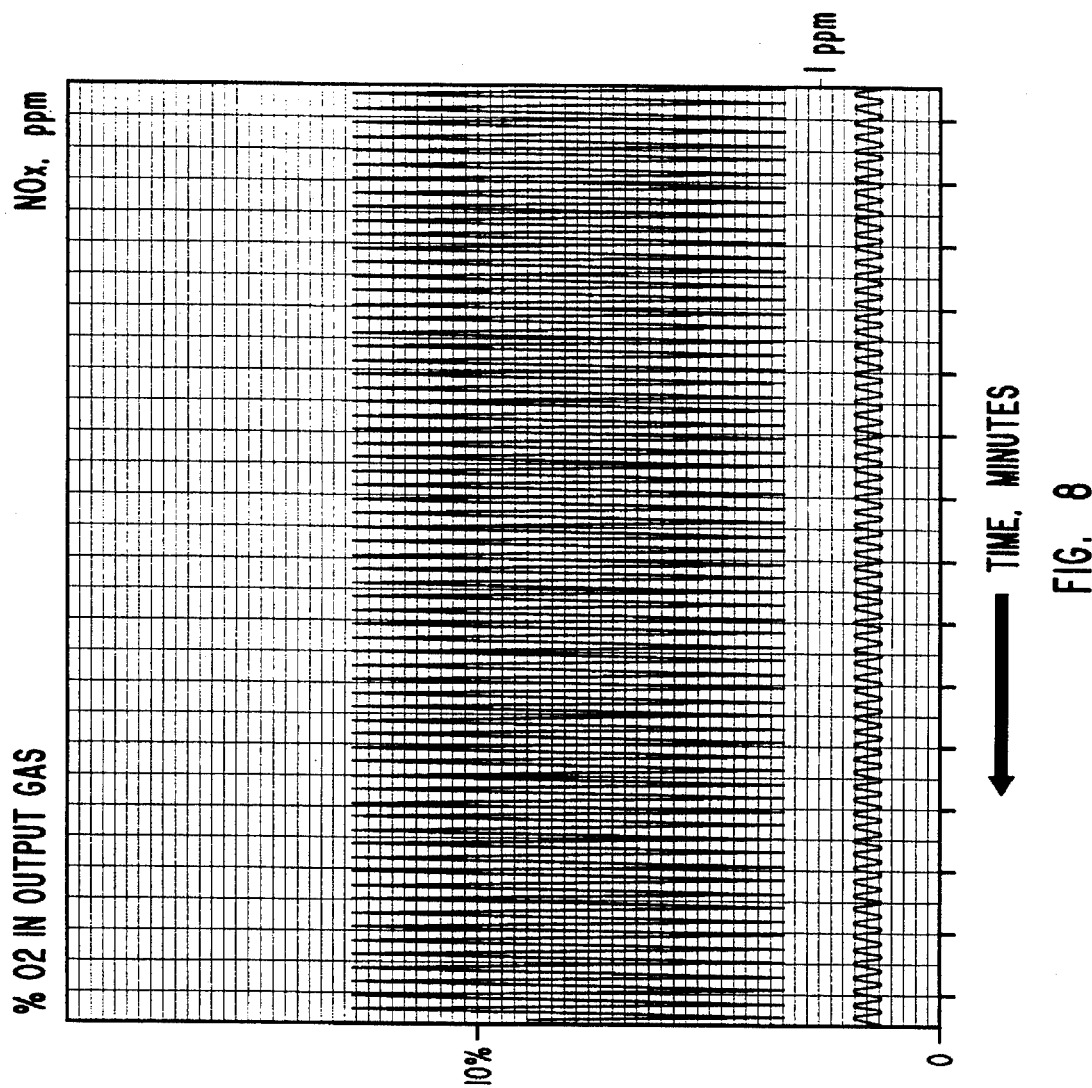

The production of $NO_x$ results from both extremely high temperature and from contact between the fuel and air. As shown in FIG. 8, $NO_x$ levels of less than 1 ppm have been achieved during early testing of the present invention. As shown in Table 1 below, $NO_x$ levels of less than 0.1 ppm were achieved in later testing. This illustrates that while prior devices have achieved a partial control of $NO_x$ production by avoiding extremely high temperatures, the present invention provides a virtually complete elimination of $NO_x$ production by avoiding both extremely high temperatures and contact between the fuel and air.

While not wishing to be bound by any specific theory of why this "unmixed combustion" achieves very low $NO_x$ production, the experimental results given in the examples below are not incompatible with the generally accepted mechanisms for $NO_x$ production.

For fuels which do not contain chemically bound nitrogen, it is generally agreed that $NO_x$ is chiefly thermal $NO_x$, i.e. most of the $NO_x$ is produced by the "extended" Zeldovitch mechanism, $O+N_2=NO+N$, $N+O_2=NO+O$, $OH+N=NO+H$. The other source of $NO_x$ is the prompt $NO_x$ mechanism, i.e. the attack of hydrocarbon radicals such as CH on $N_2$ to produce HCN which is then oxidized to NO. Both these mechanisms are strongly disfavored at lower temperatures and prompt $NO_x$ requires contact between the fuel and air. By eliminating direct contact between the fuel and air, unmixed combustion avoids $NO_x$ production via the prompt $NO_x$ mechanism. Since the extremely high temperatures normally associated with combustion are also avoided, the thermal $NO_x$ mechanism is also avoided.

A combustion system in which $NO_x$ production is controlled comprises a combustion device in which fuel and air are largely unmixed during combustion, such that direct contact between the fuel and air, which favors the production of $NO_x$, is substantially eliminated. Extremely high temperatures, which also favor the production of $NO_x$, are also avoided. An oxidizing means supplies a reducible metal oxide so as to provide a reservoir of oxygen to oxidize the fuel. A means for contacting a reduced metal oxide with air so as to reoxidize the reduced metal oxide and renew the reservoir of oxygen is also provided.

In one embodiment for the above combustion system, the fuel and air are passed alternately through a bed of the reducible metal oxide, with the amount of fuel being passed during each cycle being less than that which would be required to completely reduce the metal oxide to metal. The amount of air which is passed during each cycle is more than sufficient for complete oxidation of the fuel.

In another embodiment, the fuel and air are passed through different regions of the combustion system, and the readily reducible metal oxide/readily oxidized metal moves between these regions. The amount of air going through one region is more than sufficient to fully oxidize the amount of fuel being passed through the other region. The rate of circulation of the readily reducible metal oxide/readily oxidized metal between the regions is sufficient to keep at least some metal oxide in the fuel region at all times.

In an alternate embodiment of the above combustion system, the fuel and air are alternately contacted with the reducible metal oxide, with the amount of fuel being contacted during each cycle being less than that which would be required to completely reduce the metal oxide to metal. The amount of air which is contacted during each cycle is more than sufficient for complete oxidation of the fuel.

One method of controlling $NO_x$ production in a combustion system comprises the steps of providing a combustion device in which the fuel and air are largely maintained unmixed before and during combustion, such that mixing of the fuel and air before and during combustion, which favors the production of $NO_x$, is largely avoided, and extremely high temperatures, which also favor production of $NO_x$, are avoided. The combustion device comprises oxidizing means for supplying a reducible metal oxide so as to provide a reservoir of oxygen to oxidize the fuel. An amount of the fuel and an amount of the air are contacted alternately with the oxidizing means, with the amount of the fuel being less than that which would be required to completely reduce the metal oxide to metal, and the amount of the air being at least sufficient for complete oxidation of the amount of the fuel.

Another method of controlling $NO_x$ production in a combustion system also uses a combustion device in which the fuel and air are largely maintained unmixed during combustion as discussed above. The oxidizing means comprises a first region and a second region between which a readily reducible metal oxide can circulate. The readily reducible metal oxide circulates between the first region and the second region at a rate sufficient to keep at least some metal oxide in the first region at all times. An amount of the fuel is passed through the first region, and an amount of the air is passed through the second region, with the amount of air passed through the second region being at least sufficient to completely oxidize the amount of fuel passed through the first region.

For embodiments in which the catalyst bed is motionless, the alternating flows of fuel and air may be provided by mechanical valves or by aerodynamic valves. For embodiments in which the flow paths of the fuel and air remain unchanged and the unmixed combustion catalyst moves between the flow paths, a catalyst which is a fluidizable powder and which is transferred from one flow path to the other hydrodynamically may be used.

Figure 11:
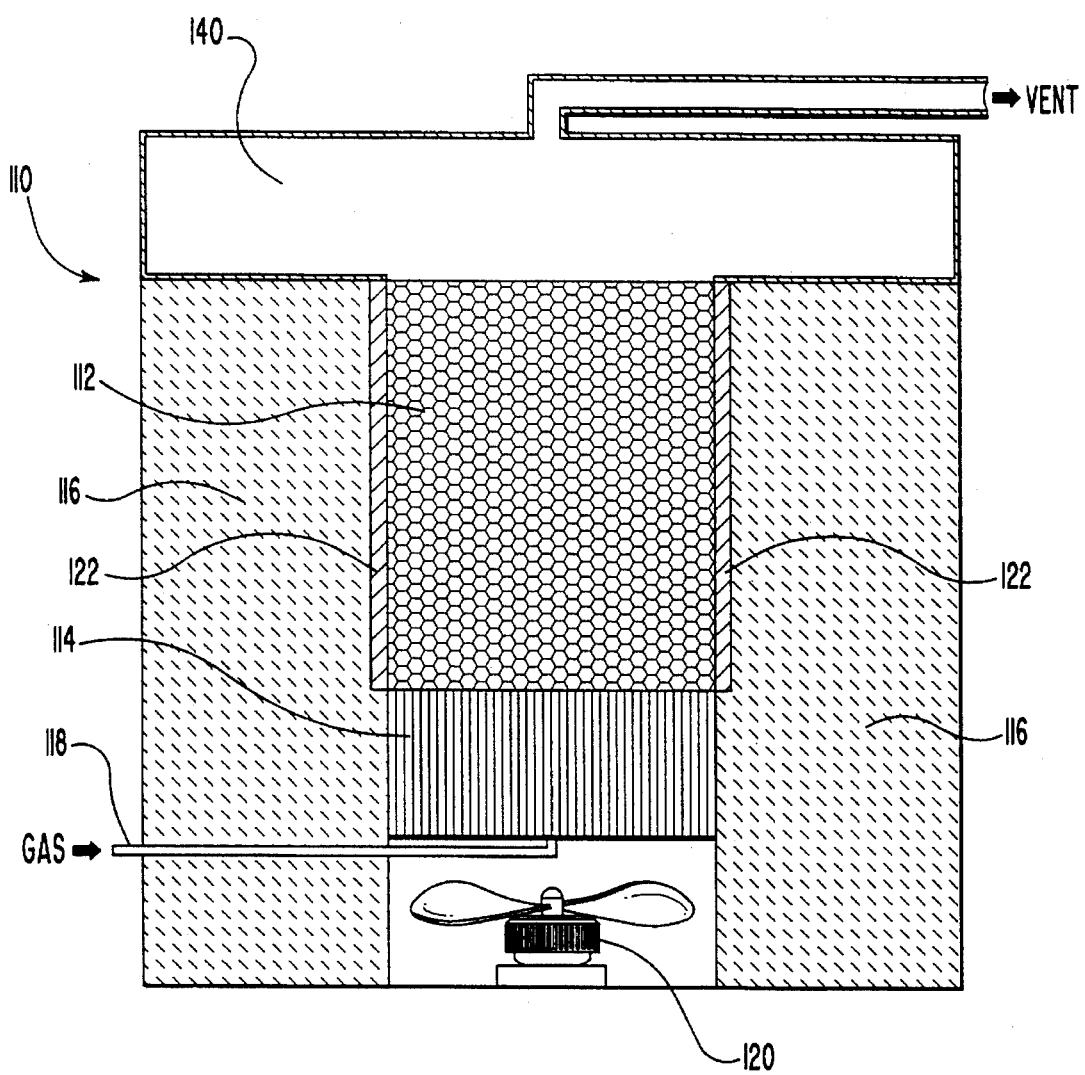
FIG. 11 shows a design for an unmixed combustion system using a rotary natural gas/air distributor.
Figure 12:
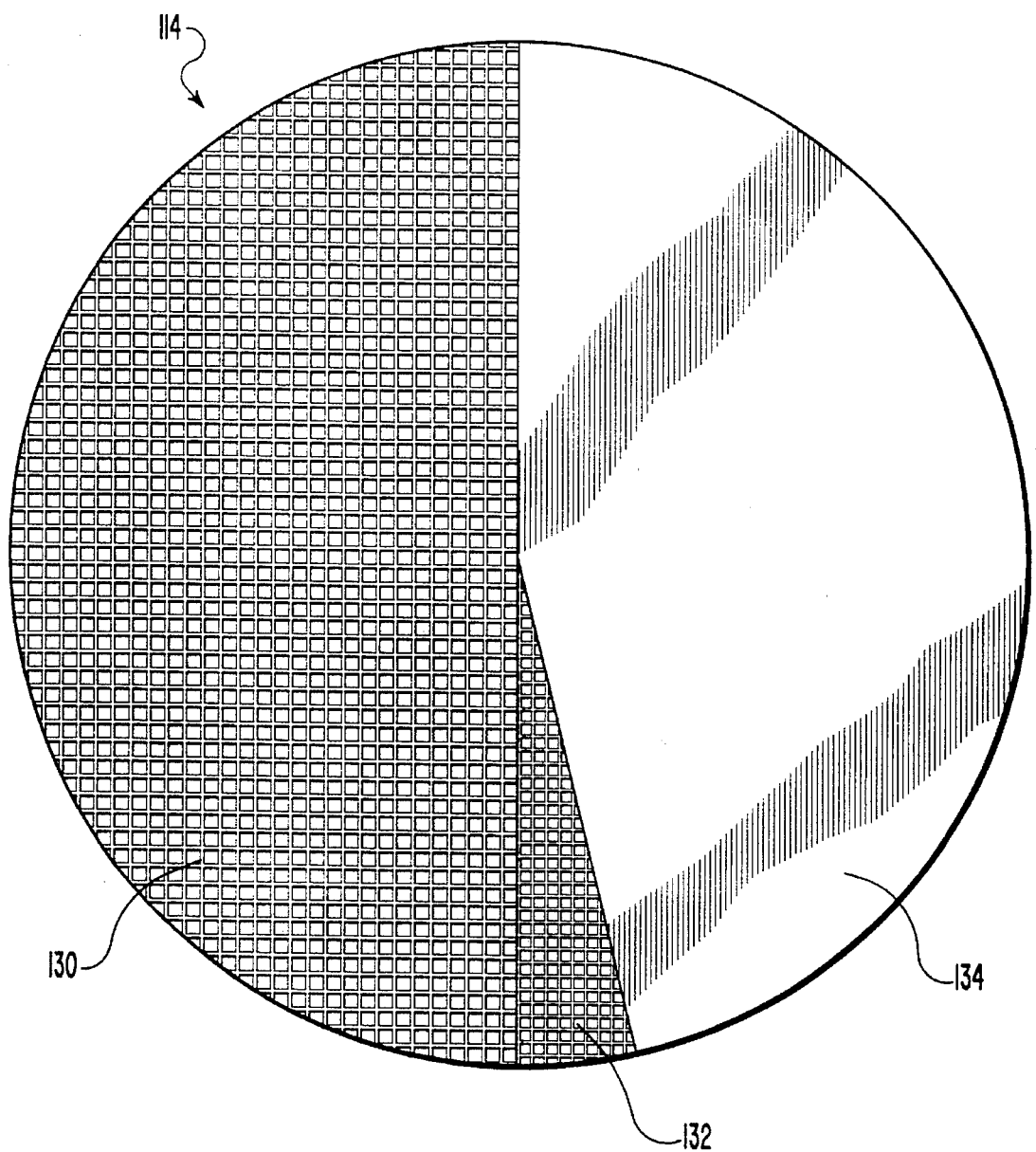
FIG. 12 shows details of the rotary natural gas/air distributor of FIG. 11.

In embodiments in which the catalyst is a honeycomb structure, the fuel and air inlets may pass through a perforated plate at one end of the honeycomb structure. Such an embodiment is shown in FIGS. 11 and 12. FIG. 11 shows a design for an unmixed combustion system 110 for industrial process heat recovery. Combustion system 110 has a catalyst honeycomb structure 112 and a natural gas/air rotary distributor plate 114. An insulation layer 116 surrounds catalyst honeycomb structure 112 and rotary distributor plate 114. Gas line 118 feeds into rotary distributor plate 114, and a fan 120 for directing air through rotary distributor plate 114 is adjacent thereto. An electric heater 122 surrounds catalyst honeycomb structure 112.

FIG. 12 is an enlarged overhead view of rotary distributor plate 114 showing details thereof. Air flow is directed through section 130, while natural gas is flowed through section 132. Section 134 is completely solid so that there is no flow of air or gas through section 134. The alternating flows of fuel and air are directed through catalyst honeycomb structure 112 (FIG. 11) and to a conventional heat recovery system 140. Rotation of catalyst honeycomb structure 112 and rotary distributor plate 114 with respect to each other may be used to send alternating flows of fuel and air through each section of catalyst honeycomb structure 112.

D. Enhanced Heat Transfer

One of the major limitations of fire as a method of heat generation is that fire initially deposits the heat of combustion of the fuel in the gas phase. In many applications it is then necessary to transfer the heat from the gas phase to a solid surface such as the surface of a heat transfer tube. Since the coefficient of heat transfer from a flowing gas to a solid surface is relatively low, efficient recovery of the heat requires the use of large amounts of surface area with resultant high expense.

Unmixed combustion has the advantage that the heat of combustion is liberated within the unmixed combustion catalyst. Thus, if the unmixed combustion catalyst is in good thermal contact with the heat transfer surface, heat may be rapidly transferred from one to the other and the need to provide large amounts of surface area at correspondingly high expense may be avoided. This good thermal contact between the unmixed combustion catalyst may be provided by bonding a readily reducible metal oxide on a refractory support to one side of a heat transfer surface. Alternatively, the readily reduced metal oxide can be the outer layer of the heat transfer surface.

The advantages of this embodiment of the present invention become clearer when one considers a numerical example. A typical heat transfer coefficient for a gas flowing passed a solid surface is about 25 BTU/ft$^2$/hr/°F., (i.e. 0.142 watts/cm$^2$/°C. Thus, for a gas with a temperature of 1000° C. flowing over the outside of a heat transfer tube, with the heat transfer liquid flowing through the inside of the tube being at a temperature of 800° C., the rate of heat transfer would be 2.84 watts/cm$^2$. If, however, the heat transfer tube is coated with a layer of CuO, 0.1 cm thick, this layer having a voidage of 50%, 25% of this layer being converted to metallic copper and back to the oxide once every second, this would supply heat to the heat transfer liquid at a rate of 807 watts/cm$^2$, an improvement by a factor of 284.

In this embodiment, the unmixed combustion catalyst is alternately contacted with fuel and air. This may be done by use of mechanical valves, aerodynamic valves or other means.

The rate of heat input to the unmixed combustion catalyst via combustion of the fuel, and the rate of heat transfer out of the catalyst to heat transfer surface, must be such that the surface temperature of the unmixed combustion catalyst is maintained in the preferred range for operating the catalyst. If, for example, a heat transfer tube is coated with a layer of copper oxide and has a fluid flowing through it at a temperature of 500° C. to 1000° C., the rate of heat transfer between the catalyst and the tube must be high enough so that the surface temperature of the catalyst does not rise above 1000° C. Conversely, if the heat transfer fluid flowing through the tube has a temperature of 100° C., the rate of heat transfer from the catalyst to the tube must be low enough so that the temperature of the catalyst does not fall below 500° C.

E. Enhanced Thermoelectric Power Generation

Figure 14:
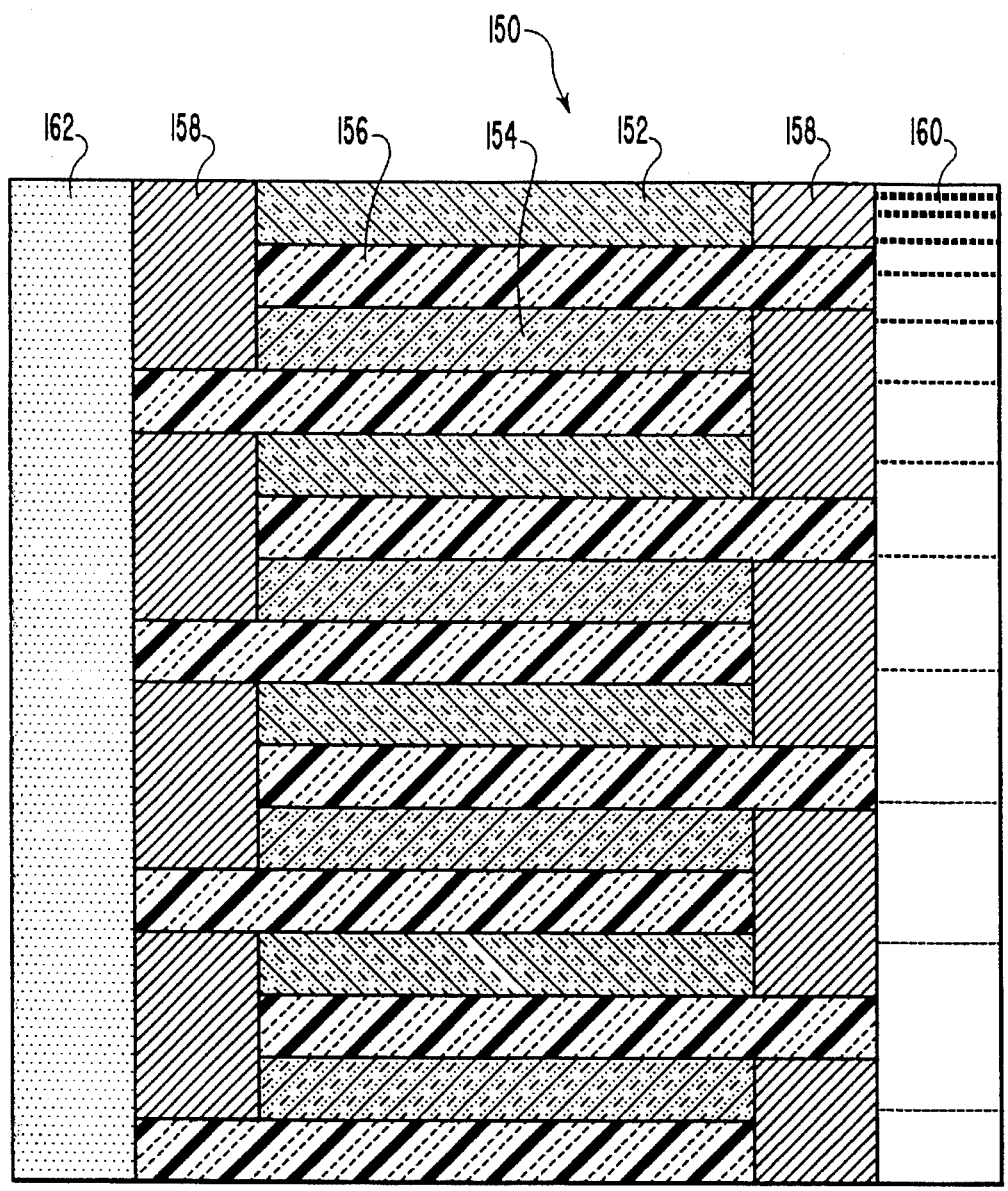
FIGS. 14 and 15 show a setup for thermoelectric generation of power with use of conventional combustion and unmixed combustion, respectively.

FIG. 14 shows a design for thermoelectric power generation based on the teachings of the prior art. A stack 150 has alternating multiple layers of n type semiconductors 152 and p type semiconductors 154, which are separated by layers of an insulator 156. The ends of these layers are alternately connected by layers of a metallic conductor 158 so that they are electrically in series. One side of stack 150 is in thermal contact with water 160 at a relatively low temperature, such as 50° C. in the design of FIG. 14. The other side of stack 150 is in thermal contact with hot combustion gases 162 coming out of a flame, which is at 1200° C. in the design of FIG. 14. Heat will be transferred from the combustion gases 162 to the n and p type semiconductors 152, 154 and as the heat flows therethrough, some of this heat will be converted to electrical energy via the well known thermoelectric effect.

As is well known, the fraction of the heat which is converted to electricity increases as the temperature difference between the hot and cold junctions is increased. Since the temperature of the cold junction is fixed, maximum efficiency will result if the temperature of the hot junction is close to the temperature of the combustion gases. The rate of heat transfer from the combustion gases to the hot junction is, however, proportional to the temperature difference between them. Thus, increasing the temperature of the hot junction has the effect of both increasing the fraction of the input heat which is converted to electricity and of decreasing the amount of heat that is available. Thus, a compromise must be made between conflicting design requirements.

For the sake of an example, let us assume that in this design compromise a hot junction temperature of 1000° C. is chosen. If the coefficient of heat transfer from the hot gas to the surface of the stack is 25 BTU/ft$^2$/hr/°F., and the temperature difference is 400° C., the rate of heat input to the stack will be 5.68 watts/cm$^2$. For a semiconductor with a thermal conductivity of 0.02 watts/cm°C., a temperature difference of 750° C. and a heat through put of 5.68 watts/cm$^2$ imply that the stack has a thickness of 2.64 cm.

Figure 15:
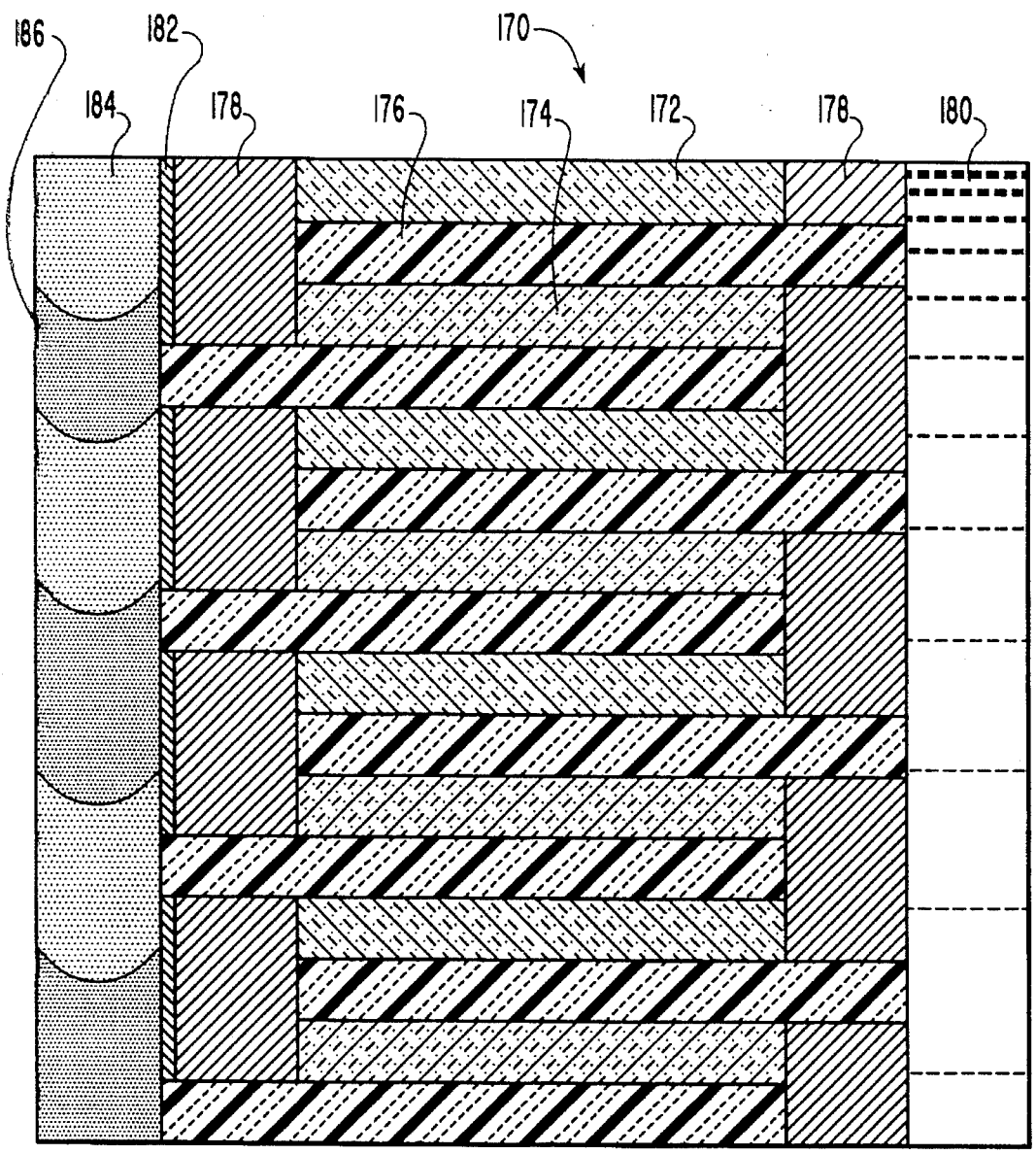

FIG. 15 shows the application of enhanced heat transfer via unmixed combustion to thermoelectric generation of power according to the present invention. A stack 170 has alternating multiple layers of n type semiconductors 172 and p type semiconductors 174, which are separated by layers of an insulator 176. The ends of these layers are alternately connected by layers of a metallic conductor 178 so that they are electrically in series. One side of stack 170 is in thermal contact with water 180 at a relatively low temperature, such as 50° C. in the design of FIG. 15. The other side (or high temperature side) of stack 170 has a metal oxide layer 182 attached to metallic conductor 178. Metal oxide layer 182 is in thermal contact with hot unmixed combustion gases of air 184 and fuel 186. Heat will be transferred from the unmixed combustion gases of air 184 and fuel 186 via metal oxide layer 182 to the n and p type semiconductors 172, 174, and as the heat flows therethrough, some of this heat will be converted to electrical energy.

If the rate of heat input to stack 170 in FIG. 15 is increased to 807 watts/cm$^2$ (a factor of 142), the thickness of the stack can be decreased to 0.0186 cm, while maintaining the hot junction temperature unchanged at 1000° C. This corresponds to an increase in the system's production of electricity by a factor of 142, and a decrease in the weight of semiconductors needed by the same factor of 142. Thus, the electrical power produced per unit weight of semiconductor is increased by a factor of 142×142 or 20164 by use of the present invention.

F. Controlling $CO_2$ Emissions During Combustion

The problem of global warming due to the emissions of $CO_2$ during combustion has recently begun to receive a great deal of serious attention. This problem has led to calls for improved thermal efficiency, increased energy conservation, and similar measures which would marginally decrease $CO_2$ emissions. There have, however, been few if any serious proposals for developing a technology that would solve the problem, i.e. a technology that would permit fossil fuel combustion without substantial $CO_2$ emissions.

The present invention provides a means of burning fuel that produces combustion gases from which the $CO_2$ is readily recovered, thereby reducing the undesirable emissions of $CO_2$ to the atmosphere. Unmixed combustion can be done with a metal oxide such as copper oxide circulating between a pair of fluid beds. The gas coming out of one bed would, after condensation of water, be virtually pure $CO_2$. In many locations, pure $CO_2$ could economically be pumped down abandoned gas wells, used in tertiary oil recovery or put to other use. Previously, these options have been given little consideration because recovering dilute $CO_2$ from combustion effluents is expensive and consumes considerable amounts of energy. Since unmixed combustion as used in the present invention can avoid the problems of $CO_2$ recovery, a means of burning fuel without $CO_2$ emissions is provided.

If preferred, instead of using a system in which copper oxide circulates between fluid beds, a single bed with a valve or other flow control device on its outlet may be used. When the gas coming out of the bed consists of $CO_2$ and water vapor, this flow control device would direct the gas to $CO_2$ recovery facilities. When the gas coming out of the bed consists of air whose oxygen content has been decreased, the flow control device would direct the gas to disposal.

A novel combustion system in which $CO_2$ production is controlled comprises a combustion device in which the fuel and air are largely unmixed during combustion, such that direct contact between the fuel and air is substantially eliminated and extremely high temperatures are avoided. A bed of a readily reducible metal oxide is used so that the fuel can be oxidized without contacting the air. Post combustion mixing of the oxidized fuel and the oxygen depleted air can be avoided by various means such as by using three way valves.

Alternatively, the unmixed combustion catalyst may be in the form of a refractory honeycomb structure with plates on the top and bottom. One plate covers the inlet of the channel through the honeycomb structure and the other plate covers the outlet. One of these plates has means for sending the fuel and air into the channels through the honeycomb structure and the other has means for allowing the burned fuel and oxygen depleted air to exit. While the plates do not rotate with respect to each other, they do rotate with respect to the honeycomb structure and thus unmixed combustion is achieved and post combustion mixing of the products of combustion with air is avoided.

In a preferred embodiment, a combustion system is provided wherein the $CO_2$ produced by combustion is recovered. Means are provided whereby fuel and air are passed alternately through a bed of a readily reducible metal oxide. The ratio of the amount of fuel to the amount of air being passed during each cycle is less than that which would be required for stoichiometric combustion, and the amount of fuel which is passed during each cycle is less than sufficient for complete reduction of the readily reduced metal oxide. The gas coming out of the bed is alternately sent in different directions, with the $CO_2$ and steam produced while fuel is input going in one direction and the gas produced during air input being sent in the other direction. The heat produced in the above system can also be recovered.

A method for generating heat and for controlling $CO_2$ emissions during combustion uses the above combustion system in providing a bed of a readily reducible metal oxide, and passing an amount of fuel and an amount of air alternately through the bed in cycles. The passage of air through the bed produces a gas and the passage of fuel through the bed produces $CO_2$ and steam. The gas produced by the passage of air through the bed, and the $CO_2$ and steam produced by the passage of fuel through the bed, are separated. The $CO_2$ produced by the passage of fuel through the bed is recovered, and the heat produced by passing the air and fuel through the bed is also recovered.

G. Chemical Munitions Incinerators

The present invention also includes a method and system for safe disposal of chemical munitions, both nerve agent munitions and those which use other toxins. Like the United States, the nations of the former Soviet Union are obligated by treaty to dispose of their chemical munitions. The task they face, however, is even more difficult than that facing the United States Army. According to reports in the news media, the Soviet weapons are "unitized", i.e. instead of being made of several pieces which can be disassembled and dealt with separately they are fabricated in such a manner that disassembly is not feasible. Thus, in the United States Army's plans, puffing will be a rare event, happening only when a munitions which has not been disassembled is accidentally fed to one of the incinerators. For the Soviet munitions, however, munitions must be fed whole to the incinerator which means that every single one of them will puff.

Adding to this difficulty is the fact that much of the Soviet chemical arsenal, which does not consist of nerve agents, does consist of Lewisite, a poison first used in World War I. The empirical formula for Lewisite is $C_2H_2AsCl_3$. The size of the Soviet arsenal is reportedly so great that the arsenic it contains would supply the entire world's demand for arsenic for several years. Officials of the nations of the former Soviet Union desire to convert the Lewisite into materials which can be sold. This desire is quite reasonable both because such sale would bring them badly needed foreign exchange and because it is difficult to imagine any environmentally acceptable method of disposing of such a vast quantity of arsenic other than sale.

For a conventional incinerator, however, the economical recovery of the arsenic in Lewisite would be a matter of great difficulty. In a conventional incinerator, the arsenic Lewisite would be oxidized to arsenic oxide, a relatively volatile material and this volatile arsenic oxide would be diluted with nitrogen from the combustion air. Thus, the amount of gas that would have to be treated to recover the arsenic would be large and the arsenic once recovered would be in an oxidized state. In such a state, the arsenic would not command as high a price as it would as the metal. Furthermore, to comply with their treaty obligations the former Soviets must destroy their chemical arsenal in a few years, but to avoid flooding the world market for arsenic they must sell their arsenic over a period of decades. Thus, they must store large quantities of arsenic which will be less expensive and less hazardous if the arsenic is in the form of the metal rather than the oxide.

The present invention provides a means of satisfying these needs. The chemical munitions are introduced into a heated chamber for explosion within the chamber, with the heated chamber comprising means for adding the munitions to the chamber, means for harmlessly exploding the chemical munitions, and means for controlling the flow of gas through the chamber so that the gas all leaves through a predetermined exit. The temperature of the heated chamber is maintained at a level sufficient to cause the release of toxic chemicals and the reaction of whatever explosive material, propellant or other energetic materials the chemical munitions contain. A bed of readily reducible metal oxide such as copper oxide is connected to the exit of the heated chamber. The metal oxide bed is maintained in an oxidized state by periodically contacting the bed with air. This bed is preferably maintained at a temperature of at least about 615° C., the sublimination temperature of arsenic metal.

The explosion of the munitions produces a mixture of explosion gases from the munitions propellant (chiefly $H_2$, CO, and $N_2$, with minor amounts of $CO_2$, $H_2O$, and NO) and vaporized Lewisite. Passage through the readily reducible metal oxide oxidizes the CO and $H_2$ to $CO_2$ and $H_2O$ and converts the Lewisite to $CO_2$, $H_2O$, HCl and gaseous arsenic vapor. It will readily be understood that as oxidizing agents, metal oxides such as copper oxide have quite different properties from the molecular oxygen in air. Thus, it can readily be calculated that at a temperature of 823° C. the free energy change for the reaction $As_4(gas) + 3O_2 = As_4O_6(gas)$ is 18.7 kcal negative and this reaction can, as a matter of thermodynamics, readily go to completion. On the other hand, the reaction $As_4(gas) + 6CuO = As_4O_6(gas) + 6Cu$ is 65.1 kcal positive and this reaction cannot occur except to an extremely trivial extent.

After passing through the metal oxide bed, the vapors are allowed to cool, the arsenic is recovered, and the remaining gases are given whatever further treatment may be needed before they are discharged to the environment. This may involve sending the gases to a conventional afterburner to destroy whatever traces of Lewisite that managed to pass through the metal oxide bed, and it may also involve removal of the HCl via a wet scrubber.

The amount of air which is periodically passed through the oxide bed is preferably adjusted with respect to the amounts of toxic chemicals and other oxidizable materials exiting from the chamber such that on an average over time the total amount of oxygen passing through the bed of readily reducible metal oxide is at least sufficient for complete oxidation of the oxidizable materials. For example, for munitions which contain 5 lb of the explosive tetryl and 15 pounds of Lewisite, explosion of the tetryl would produce 19.8 gram moles of nitrogen gas, 55.4 gram moles of carbon monoxide, 7.9 gram moles of water vapor, 11.87 gram moles of hydrogen, and 21.92 gram moles of Lewisite. Oxidizing this much material to carbon dioxide, water vapor, HCl and metallic arsenic vapor will convert 144 gram moles of CuO to Cu. Thus, the bed must have an oxidizing capacity this large and it must be contacted with an amount of air of at least 360 gram moles (i.e. 10.4 Kg) for each such munitions feed to the chamber.

H. Low $NO_x$ Munitions Incinerator

The military also has a long standing problem of disposing of overage explosives without unacceptable $NO_x$ emissions. When explosives are detonated they produce a fireball of hot gas a large fraction of which is CO. The amount of $NO_x$ produced is, on a mass basis much smaller but is still large enough to be a significant emission of an air pollutant. Previously available technology was capable of solving either of these problems but not both. If the fireball was allowed to mix freely with air, the CO would be oxidized but the $NO_x$ would be emitted to the environment.

Alteratively, the explosive could be detonated in a heated chamber as discussed above and the gases from the explosion passed through an $NO_x$ reduction catalyst. Many such catalysts are known in the art and they are commonly used to reduce the emissions of $NO_x$ by automobiles. Such an approach, however, has the problem that coming out of the catalyst would be a highly pulsating flow of a gas containing large amounts of CO. Within the prior art, the requirement for complete oxidation of a flowing gas with air is that all of the flowing gas must be mixed with an at least stoichiometric quantity of air. Furthermore, the quantity of air with which the flowing gas is mixed cannot be too great or the mixture will be below the flammability limit. Thus, within the prior art it is necessary to at least approximately match the amount of air used to the flow of combustible gas. For the extremely rapid fluctuations in gas flow rate which an explosion produces this can be a matter of great difficulty.

The present invention, however, provides a satisfactory solution to this problem. After passage through an $NO_x$ reduction catalyst, the flow of CO containing gas is passed through a bed of a readily reduced metal oxide. A flow of air is also passed through this bed. The rate at which air is passed through the bed is adjusted with respect to the amounts of CO and other reducing gases such that, on a time average basis, the total amount of oxygen passing through the bed is at least sufficient for complete combustion of the CO and other oxidizable gases in the gases produced by the explosion.

A method and system for safe disposal of explosives and other energetic materials comprises providing an incinerator having a heated chamber for harmlessly exploding energetic materials. The heated chamber includes a means for controlling the path by which gases produced in the chamber flow thereout. The incinerator also includes means for reducing $NO_x$, and a bed of readily reducible metal oxide positioned downstream of the $NO_x$ reducing means. Energetic materials are introduced into the heated chamber, and the temperature of the heated chamber is maintained at a level sufficient to cause the reaction of the energetic materials. The gases produced by the reaction of the energetic materials are flowed through the $NO_x$ reducing means, and air is added downstream of the $NO_x$ reducing means. The gases are then flowed through the bed of readily reducible metal oxide so that the gases are oxidized.

I. $N_2$ Production

There are a great many industrial uses for nitrogen gas ($N_2$). For those who use $N_2$ in small amounts, high pressure cylinders are a satisfactory answer. For those who use $N_2$ in very large amounts, fractional distillation of liquid air is quite economical. In between, however, there are people whose nitrogen usage is far too small to justify an air liquefaction plant but who find having an endless series of gas cylinders trucked in to be expensive.

The present invention solves this problem. To produce an inert gas consisting chiefly of nitrogen with a small argon impurity, means are provided both to alternately contact a bed of a readily reducible metal oxide with fuel and air in cycles, and to avoid mixing of the fuel and air after they have contacted the bed. In one embodiment this would be done by having mechanical or aerodynamic valves at the inlet and outlet of the bed. In another embodiment the fuel would pass through one fluid bed, the air through another bed, and the readily reducible metal oxide would circulate between them. In still another embodiment the bed would be a refractory cylinder with end plates through which the fuel and air enter and leave and the cylinder would rotate with respect to these end plates as discussed above.

In all embodiments for making nitrogen gas the ratio of the amount of fuel to the amount of air being passed during each cycle is greater than that which would be required for stoichiometric combustion. The amount of air which is passed during each cycle is less than sufficient for complete oxidation of the readily oxidized metal. The contacting of air with the bed produces nitrogen and the contacting of fuel with the bed produces a gas. The nitrogen produced by passage of air through the bed and the gas produced by passage of fuel through the bed are kept separate. The nitrogen produced while air is input is sent in one direction via one flow path and the gas produced during fuel input is sent in another direction via another flow path. Thus, the fuel and air undergo little or no mixing before, during, or after their contact with the bed.

The gas produced by passage of fuel through the bed may be contacted with additional air so that the gas is completely oxidized. The nitrogen produced by the passage of air through the bed is recovered, and the heat produced by the passage of the air and fuel through the bed may also be recovered.

J. Lower Cost Control of $SO_x$, HCl, HF, Volatile Heavy Metals and Other Air Pollutants, and the Recovery of the Heat of Vaporization of Liquid Water When a high sulfur fuel is burned in a conventional combustor, the flue gas has to be put through a wet or a dry scrubber to remove $SO_x$. When the fuel contains chlorine or fluorine compounds, HCl or HF must be removed, again by wet or dry scrubbing. The flue gases from fuels that contain mercury, lead, arsenic, antimony, bismuth, and cadmium may also need post combustion purification. The cost of such purification increases with the amount of flue gas that must be scrubbed.

The unmixed combustion of the present invention can be useful in this process since if the combustion products do not mix with oxygen depleted air, the volume of gas from which $SO_x$ and/or other air pollutants must be removed is decreased by a large factor, the exact size of this factor depending on the fuel. If, for example, an oil with carbon to hydrogen ratio of 1 and a carbon to sulfur ratio of 30 is burned in a conventional combustion system with 20% excess air, it can readily be calculated that the resultant flue gas will contain 2463 ppm $SO_x$. Unmixed combustion for this fuel will produce a stream of oxygen depleted air and of carbon dioxide, water vapor, and $SO_x$ and it can readily be calculated that the concentration of the $SO_x$ in the latter stream is 1.32%. This implies that the volume of flue gas which must be treated is decreased by a factor of 5.34, which represents a major savings in both the capital and operating costs of the scrubber.

Furthermore, the gas that must be scrubbed will be free of oxygen. During the operation of a calcium based wet scrubber on a conventional combustion system a mixture of $CaSO_3$ and $CaSO_4$ is formed whose handling properties are far worse than either $CaSO_3$ or $CaSO_4$ alone. Since unmixed combustion will produce $CaSO_3$ as a sole product this difficulty is avoided.

A combustion system of the present invention that provides lower cost control of $SO_x$ and other air pollutants and generates heat has two streams of post combustion gases that are produced. The larger of the streams is substantially free of $SO_x$ and other pollutants, and the smaller stream contains the bulk of the sulfur and other pollutants that was present in the fuel.

A method and system for burning fuel and for controlling sulfur and other pollutant emissions during combustion of fuel contaminated with sulfur and other pollutant precursors comprises providing a combustion device in which fuel and air are largely maintained unmixed before, during, and after combustion, such that mixing of the fuel and the air before, during, and after combustion is largely avoided. The combustion device comprises oxidizing means for supplying a reducible metal oxide so as to provide a reservoir of oxygen to oxidize the fuel. An amount of the fuel and an amount of the air are contacted alternately with the oxidizing means, the amount of the fuel being less than that which would be required to completely reduce the metal oxide to metal, and the amount of the air being at least sufficient for complete oxidation of the amount of the fuel.

The passage of air through the bed produces a gas and the passage of fuel through the bed produces $SO_2$, $CO_2$, steam, and other gases. The gas produced by the passage of air through the bed, and the $SO_2$, $CO_2$, steam, and other gases produced by the passage of fuel through the bed are kept separate. The gas coming out of the bed has two flow paths, with the $SO_2$, $CO_2$, steam, and other gases produced while fuel is input going along one path, and the gas produced during air input being sent along the other. The $SO_x$ such as $SO_2$, as well as $CO_2$, HCl, HF and other pollutants produced by the passage of fuel through the bed can be recovered, and the heat produced by passage of the air and fuel through the bed can also be recovered. Vaporized metals if present can also be recovered such as mercury, lead, arsenic, antimony, bismuth, cadmium, etc.

For some fuels such as coal, the heat of vaporization of the water vapor which the combustion process produces represents a significant fraction of the heat of combustion. In conventional combustion systems this water vapor is highly diluted and consequently the dew point of the flue gas for condensation of bulk water is so low that heat of condensation of the water cannot, in most cases, be recovered in an economically useful manner. For an unmixed combustor in which the $CO_2$, water vapor, and pollutants leave the combustor in one stream and the oxygen depleted air leaves in another, the concentration of water vapor in the former stream will be increased, the bulk water dew point increased, and the economically useful recovery of the heat of vaporization of the water vapor becomes feasible.

K. Supplying of Heat to Packed Bed Reactors

There are many industrial processes in which it is necessary to supply heat to a packed bed reactor. Fire is an unsatisfactory method for generating such heat because transferring heat from the exterior of a packed bed to the interior is a slow and difficult process. For some of these industrial processes, however, it is feasible to blend an unmixed combustion catalyst into the packed bed. This allows the heat to be generated where it is needed and thus avoids problems of heat transfer.

One instance in which unmixed combustion can be advantageously used is in the production of hydrogen. It is well known in the art that any of a number of catalysts can be used to catalyze the reaction of hydrocarbons with water to produce hydrogen. This method of hydrogen production, however, has two problems. First, there is the difficulty that the hydrogen produced is not pure but is in equilibrium with CO, $CO_2$ and $H_2O$ via the reaction $$CO+H_2O=CO_2+H_2$$

Second, there is the problem that the reaction is strongly endothermic and must be supplied with heat. One of the methods used in the prior art to supply this heat was to do the reaction on the inside of metal tubes filled with catalyst while passing hot gases from a fire over the outside of these tubes. This approach, however, has the disadvantage that the tubes are required to tolerate very high temperatures and thus must be made of expensive materials.

One solution to these problems which has been proposed in the prior art is the use of CaO. In addition to being an efficient catalyst for the reaction of hydrocarbons with water vapor to form hydrogen, CO and $CO_2$, CaO has the advantage that it can react with $CO_2$ to form $CaCO_3$. This removal of $CO_2$ drives the equilibrium reaction to the right, allowing the production of nearly pure hydrogen. Furthermore, since the formation of $CaCO_3$ is highly exothermic, the heat it generates can supply the heat needed for the reaction of water and the hydrocarbon.

Thus, the use of CaO provided a satisfactory solution to both problems but it introduced a new problem: how to reconvert the $CaCO_3$ to CaO. The decomposition of $CaCO_3$ to CaO and $CO_2$ requires supplying large amounts of heat and within the limits of the prior art there was no entirely satisfactory method to do so.

Figure 16:
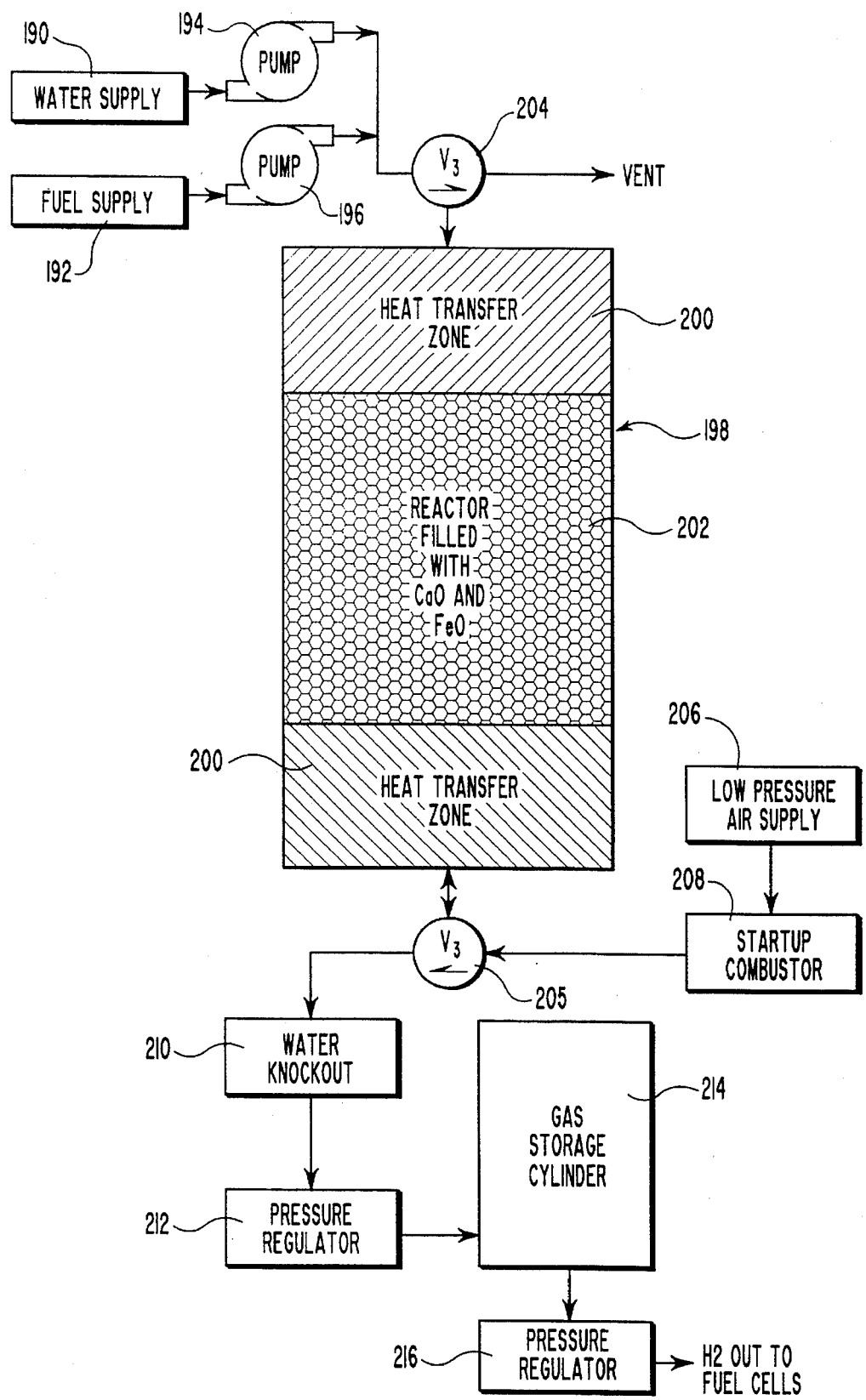
FIG. 16 shows a setup for converting a liquid hydrocarbon fuel to hydrogen of a purity suitable for use in fuel cells by means of a CaO catalyst and by use of unmixed combustion.

The use of unmixed combustion, however, solves this problem. FIG. 16 shows an example of a design for use of unmixed combustion to produce hydrogen for fuel cells. A water supply 190 and a fuel supply 192 provide water and a liquid hydrocarbon to a pair of pumps 194 and 196, respectively, which in turn direct these liquids into the top of a reactor 198 via a three way valve 204. A solid packing material 200 at the top and bottom of reactor 198 is relatively cool and acts as a heat transfer zone, while a middle region 202 of reactor 198 is hot. The water and liquid hydrocarbon trickle down, vaporize, and react to form hydrogen through an endothermic chemical reaction. This reaction goes to completion or near completion because CaO within middle region 202 reacts with $CO_2$ to form $CaCO_3$. Some of the hydrogen thus formed is reconverted to water by reaction with FeO (the unmixed combustion catalyst) also within middle region 202. The rest of the hydrogen leaves the reactor via a three way valve 205.

Periodically, three way valve 204 stops the flow of water and liquid hydrocarbon into reactor 198 and the flow of hydrogen thereout. A low pressure air supply 206 provides air through a startup combustor 208 to the bottom of reactor 198. The FeO which was reduced to Fe previously is now reoxidized to FeO, and the $CaCO_3$ decomposes to CaO and $CO_2$, with the $CO_2$ then being swept out of reactor 198. While the decomposition of the $CaCO_3$ is endothermic by 45.548 kcal/mole, the oxidation of the Fe to FeO is exothermic by 65.02 kcal/mole. Thus, a FeO/CaO ratio of 1 to 1.53 makes the overall process thermoneutral. Use of a high FeO/CaO ratio will make the process exothermic and allow the reactor to be mildly self heating and thus have some ability to sustain heat losses to the environment.

Once hydrogen gas leaves reactor 198, the hydrogen gas passes through a water knockout device 210, a first pressure regulator 212, and into a gas storage cylinder 214. When needed, the hydrogen gas is sent to a second pressure regulator 216, and then out to fuel cells.

A method of burning fuel in a combustion system utilizing this aspect of the invention comprises the steps of providing a combustion device in which fuel and air are largely maintained unmixed before, during, and after combustion, such that mixing of the fuel and the air before, during, and after combustion is largely avoided. The combustion device comprises oxidizing means for supplying a reducible metal oxide so as to provide a reservoir of oxygen to oxidize the fuel. An amount of the fuel and an amount of the air are contacted alternately with the oxidizing means, the amount of the fuel being less than that which would be required to completely reduce the metal oxide to metal, and the amount of the air being at least sufficient for complete oxidation of the amount of the fuel. This method can further comprise the step of carrying out an endothermic chemical reaction in a packed bed of a second catalyst, wherein the reducible metal oxide is mixed with the second catalyst thereby supplying the heat necessary for the endothermic chemical reaction.

EXAMPLES

The following examples illustrate use of a reducible metal oxide as a reservoir of oxygen within a combustion device. These examples are intended to be purely exemplary of the use of the invention and should not be viewed as limiting the scope of the present invention.

Example 1

The apparatus shown in FIG. 1 demonstrates, on a laboratory scale, the fixed bed embodiment within the scope of the present invention. In this experimental arrangement, rotameters 12 and 14, were used to prepare a flowing gas mixture containing oxygen and nitrogen in known proportions. For experiments involving volatile organic compounds a third rotameter 16 was used to send a measured flow of nitrogen through a bubbler 18 partially filled with the volatile organic compound. This stream of nitrogen saturated with the volatile organic was added to the flow of the oxygen/nitrogen mixture. A fourth rotameter 20 was then used to take a measured portion of this flowing mixture while the rest of the mixture was sent to vent via a back pressure regulator 22. For experiments with materials which are not readily volatile, i.e., phosphonoacetic acid, a precision metering pump was used to send a flow of an aqueous solution of the material to the top of a fixed bed 30 of copper oxide where the temperature was high enough to cause the material to vaporize.

From the fourth rotameter 20, the flowing gas mixture was sent to a three-way valve 32 and thence either went downward through fixed bed 30 and then to the analytical instruments or went directly to the analytical instruments. The analytical instruments were a flame ionization detector 34, and an oxygen meter 36, whose output was recorded by a two pen recorder 38.

In these experiments fixed bed 30 was housed in a one-inch OD stainless steel tube inside an electrically heated furnace. Two type K thermocouples were used to monitor and control the temperature. The analytical instruments used were a Beckmann 400 Hydrocarbon analyzer (i.e., a flame ionization detector) and a Teledyne $O_2$ analyzer.

The fixed bed consisted of 25.5 wt % CuO supported on 5/16 inch alumina rings and was prepared by the incipient wetness method. In this method a solution of copper nitrate was added to the alumina with constant stirring until the bed could not absorb more without becoming macroscopically wet. The alumina rings were then heated to 800° C. to drive off water and decompose the copper nitrate to copper oxide. Manufacturer's specifications on these alumina rings listed them to have a surface area of 284 $M^2$/gm, total pore volume $H_2O$ of 1.10 cc/gm, total pore volume Hg of 1.038 cc/gm, and a median pore diameter of 0.009 microns.

Table 1 lists the conditions used in these experiments. The procedure used in the experiments is described below. Initially, an oxygen and nitrogen mixture without any organic matter therein was passed through fixed bed 30. The oxygen level was measured for the gas exiting fixed bed 30. Then, organic matter was added via either bubbler 18 for volatile organic compounds, or the metering pump for the compounds not readily volatile. The oxygen level of the exit gas was again noted.

The flame ionization detector 34 was limited to concentrations less than 1000 ppmC. The change in the oxygen content which occurred when organic matter was added was used to calculate the input concentration of the organic matter. The oxygen content of the gas going into fixed bed 30 was then reduced to zero, and flame ionization detector 34 was used to measure the amount of organic matter which survived passage through fixed bed 30 as a function of time.

Figure 2:
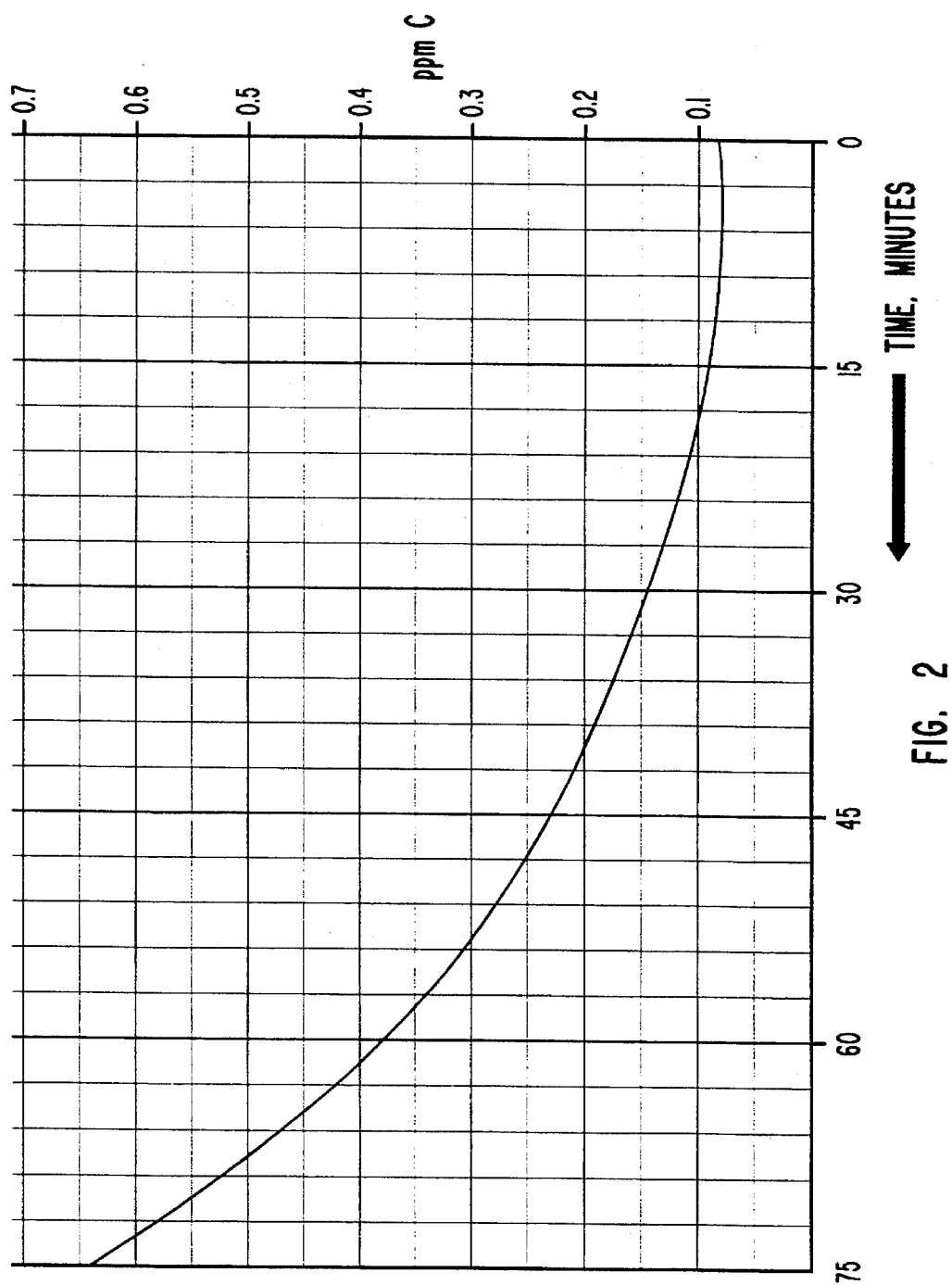
FIG. 2 illustrates results from the oxidation of the compound $C_5H_5N$ by CuO.

An example of these observations is illustrated in the graph of FIG. 2.

Figure 3:
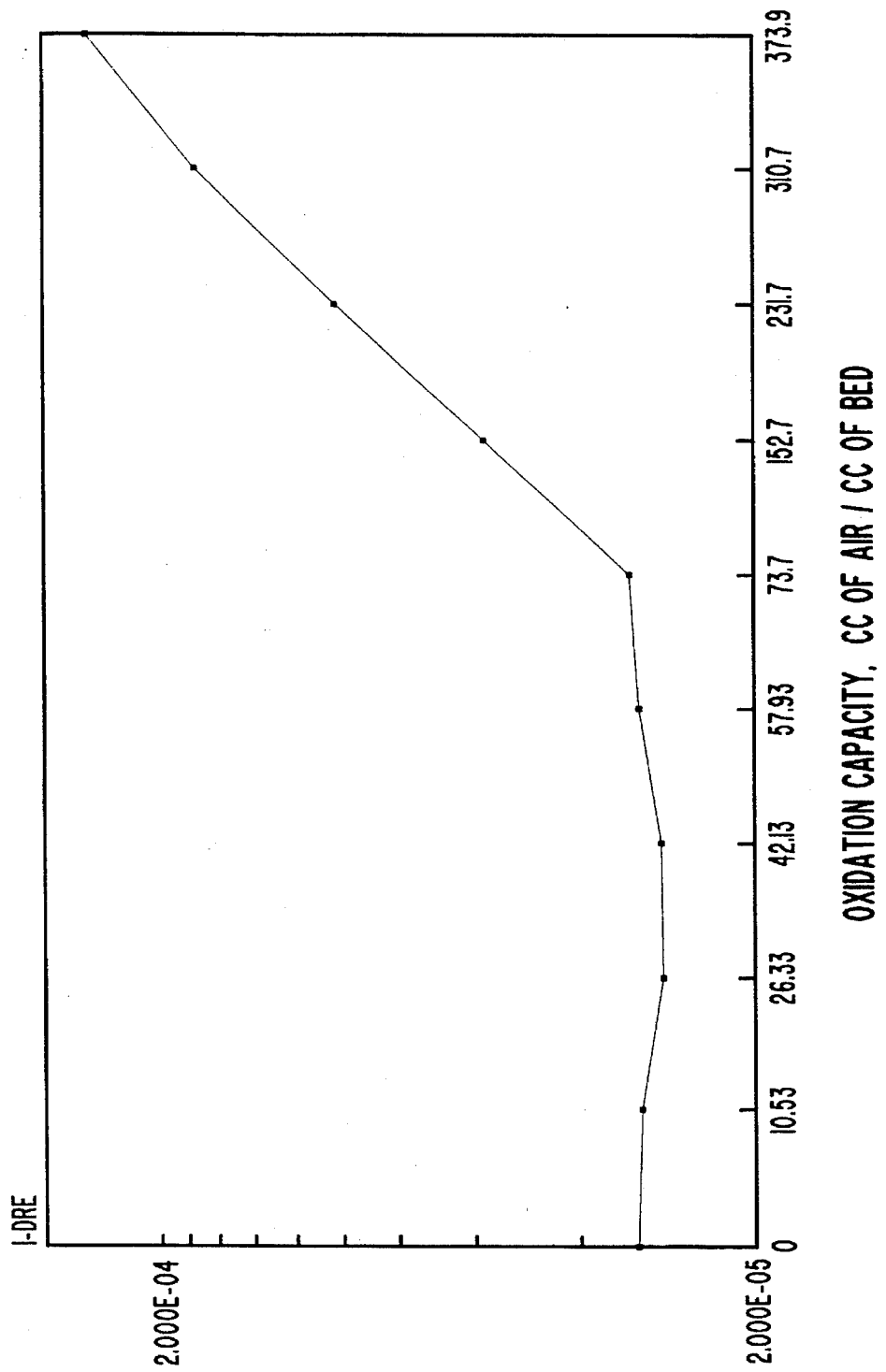
FIG. 3 illustrates results from the destruction and removal efficiency for oxidation of $C_5H_5N$ by CuO.

FIG. 3 illustrates a replot of the data in FIG. 2 in terms of the DRE, and the extent to which the fixed bed's oxidation capacity has been used. As organic matter flows through fixed bed 30 it is oxidized, and the copper oxide in the bed is reduced. Thus, the amount of copper oxide which is available to oxidize the organic matter decreases. Not surprisingly there is a point at which the amount of organic matter which escapes oxidation starts to increase and the DRE decreases.

In terms of demonstrating the utility of the present invention it is important to note the initial value of the DRE at the start of oxidation and the extent to which the fixed bed's oxidation capacity can be used while maintaining a satisfactorily high DRE. In this context a DRE of 99.9% or even of 99% may be quite satisfactorily high.

Table 1 shows the results of a series of experiments in which the DRE was measured as a function of the extent to which the oxidation capacity was used for a number of organic compounds. For $C_6H_5Cl$, $C_6H_6$, $C_5H_4S$, $C_5H_5N$, and $(HO)_2POCH_2COOH$, very high DREs are achieved initially and the bed's oxidation capacity can be used to high values while maintaining a satisfactorily high DRE. This illustrates that for wide-range organic compounds, i.e., those containing hydrocarbons and those containing oxygen, chlorine, sulfur, nitrogen and phosphorous, the instant invention provides a completely satisfactory method of preventing puffing.

The results for $C_6H_5F$ are not as successful, yet still satisfactory.

With regard to freons, freons have been found to be a special case. Because of their extreme chemical inertness, there is no available technology which can be considered as fully developed for freon disposal. When freons are in the waste feed to an incinerator, even without puffing the DRE is likely to be less than one would wish. The extent of freon destruction which the CuO bed of the present invention provides, however, is in addition to what the rest of the incinerator achieves. Thus, the present invention provides a useful improvement.

Although a fixed bed of 25.5 wt. % CuO was used in the experiment above described, the fixed bed may comprise greater than 10 wt. % CuO supported on alumina.

TABLE 1

SUMMARY OF FIXED BED EXPERIMENTS

| Run | R, the Organic Oxidized | [R]i, input Concentration of the Organic | T, °C. | Time | $O_2$, % | Init. DRE | DRE as a Function of Bed Oxid. Capacity, cc of air/cc of bed | Comments |
|---|---|---|---|---|---|---|---|---|
| 1 | $C_6H_5CL$ | 1,974 ppmC | 802° C. | 0.53 sec. | 3.6 | 99.9985% | 99.99% at 37.3 cc/cc | A |
| 2 | $C_6H_5CL$ | 3,683 ppmC | 812° C. | 0.53 sec. | 3.6 | >99.999% | 99.9% at 136 cc/cc<br>99% at 207 cc/cc | A |
| 3 | $C_6F_4$ | 10,000 ppmC | 811° C. | 0.53 sec. | 3.6 | 99.997% | 99.9% at 118 cc/cc<br>99% at 197 cc/cc | |
| 4 | $C_5H_4S$ | 19,000 ppmC | 814° C. | 0.53 sec. | 3.6 | >99.9999 | 99.9% at 186 cc/cc<br>99% at 373 cc/cc | |
| 5 | $C_6H_5F$ | 7,800 ppmC | 815° C. | 0.53 sec. | 3.6 | 99.3% | | |
| 6 | $C_6H_5F$ | 7,800 ppmC | 991° C. | 0.45 sec. | 3.6 | 99.94% | 99.9% at 2.8 cc/cc<br>99.3% at 59 cc/cc | |
| 7 | $C_5H_5N$ | 2,520 ppmC | 817° C. | 0.53 sec. | 3.6 | 99.9968% | 99.99% at 99 cc/cc | B |
| 8 | $CCl_3F$ | 6,000 ppmC | 821° C. | 0.53 sec. | 3.6 | 76% | | C |
| 9 | $(HO)_2POCH_2COOH$ | 3,110 ppmC | 818° C. | 0.53 sec. | 3.6 | 99.993% | 99.9% at 29 cc/cc<br>99% at 54 cc/cc | |

COMMENTS
A Following runs 1 and 2 a flow of nitrogen gas containing 3.02% $O_2$ was passed through the bed while monitoring the $O_2$ content of the gas leaving the bed. It was observed that the oxygen content of the gas coming out of the bed was initially zero and rose to equal the input value only after a delay of 504 seconds. This corresponds to an oxygen consumption of 0.37 moles of $O_2$ per mole of copper in the bed.
B At the start of this experiment, the DRE increased from 99.9996% to 99.999% and then began to decrease. Since reducing copper oxide can cause its surface area to increase, this result is not entirely surprising.
C In this experiment, the DRE was also 76% when the gas flowing through the reactor contained 4.1% $O_2$. Thus, the limited amount of oxidation which occurred was due solely to the copper oxide.

Example 2

Figure 4:
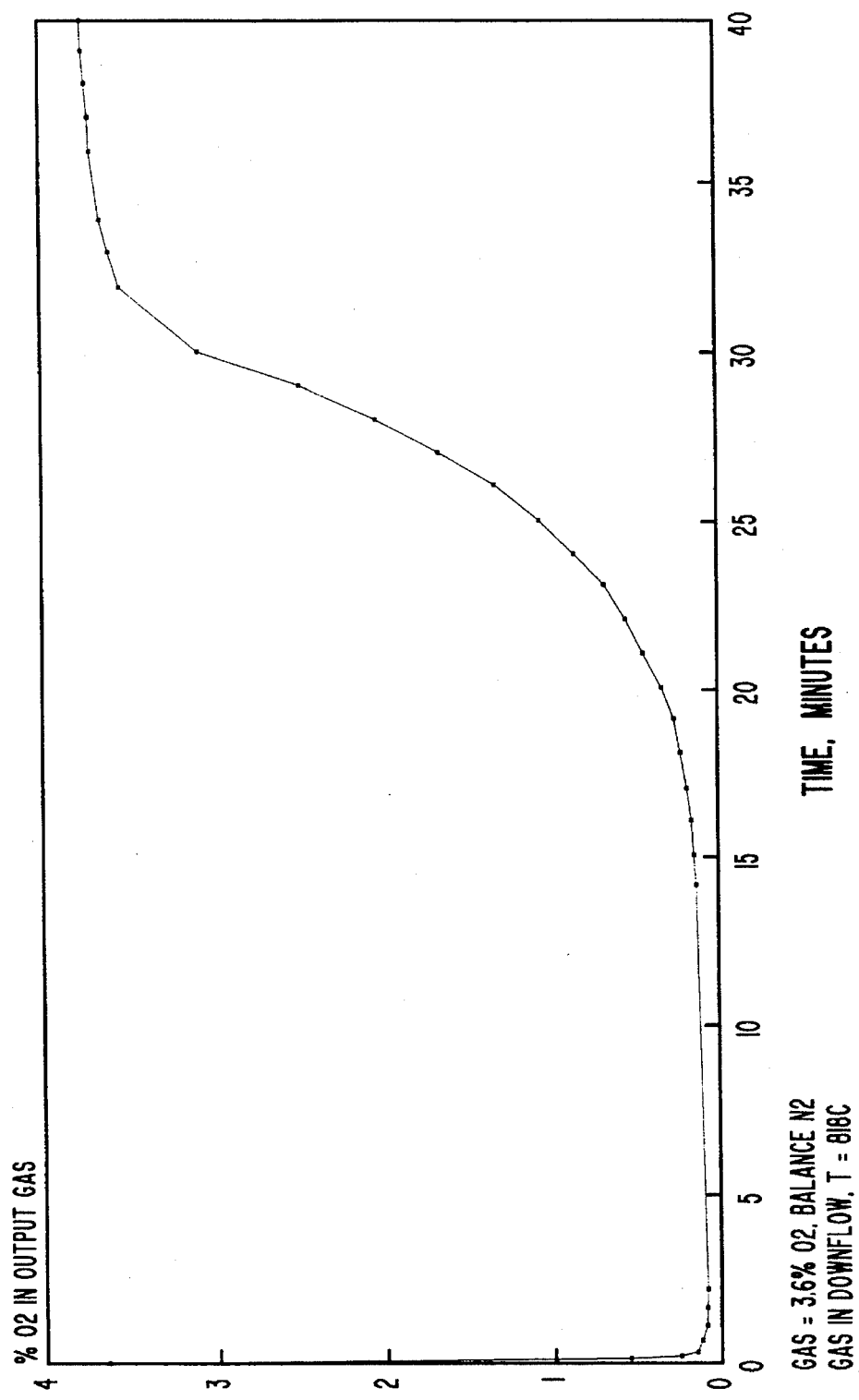
FIG. 4 illustrates results from the injection of 1 cc of home heating oil into a bed of supported CuO.

To further demonstrate the control of puffing, the experimental setup in FIG. 1 was modified to allow the sudden injection of one cc of home heating oil (referred to as a slug of heating oil) onto the top of the bed of supported copper oxide (fixed bed 30) at 818° C. while an oxygen/nitrogen mixture (3.6% $O_2$) flowed downward through the fixed bed. As the boiling ranges of home heating oils are much below 818° C., this sudden injection caused the oil to be rapidly vaporized. The flow rate of the oxygen/nitrogen mixture was sufficient to sweep the oil vapors through fixed bed 30 with a residence time of 0.53 seconds. The amount of oxygen in the gas coming out of the fixed bed 30 was measured continuously. As shown in FIG. 4, the injection of the slug of heating oil decreased the oxygen content of the gas exiting the bed for an extended period of time. When the heating oil went through fixed bed 30, the heating oil was oxidized and the copper oxide reduced to copper. When the sudden slug of heating oil was oxidized, the rate at which air was supplied was again more than sufficient for complete oxidation and the reduced metal oxide was oxidized back to its original state.

This example illustrates that the instant invention is effective against puffs of high intensity and brief duration.

Example 3

Figure 5:
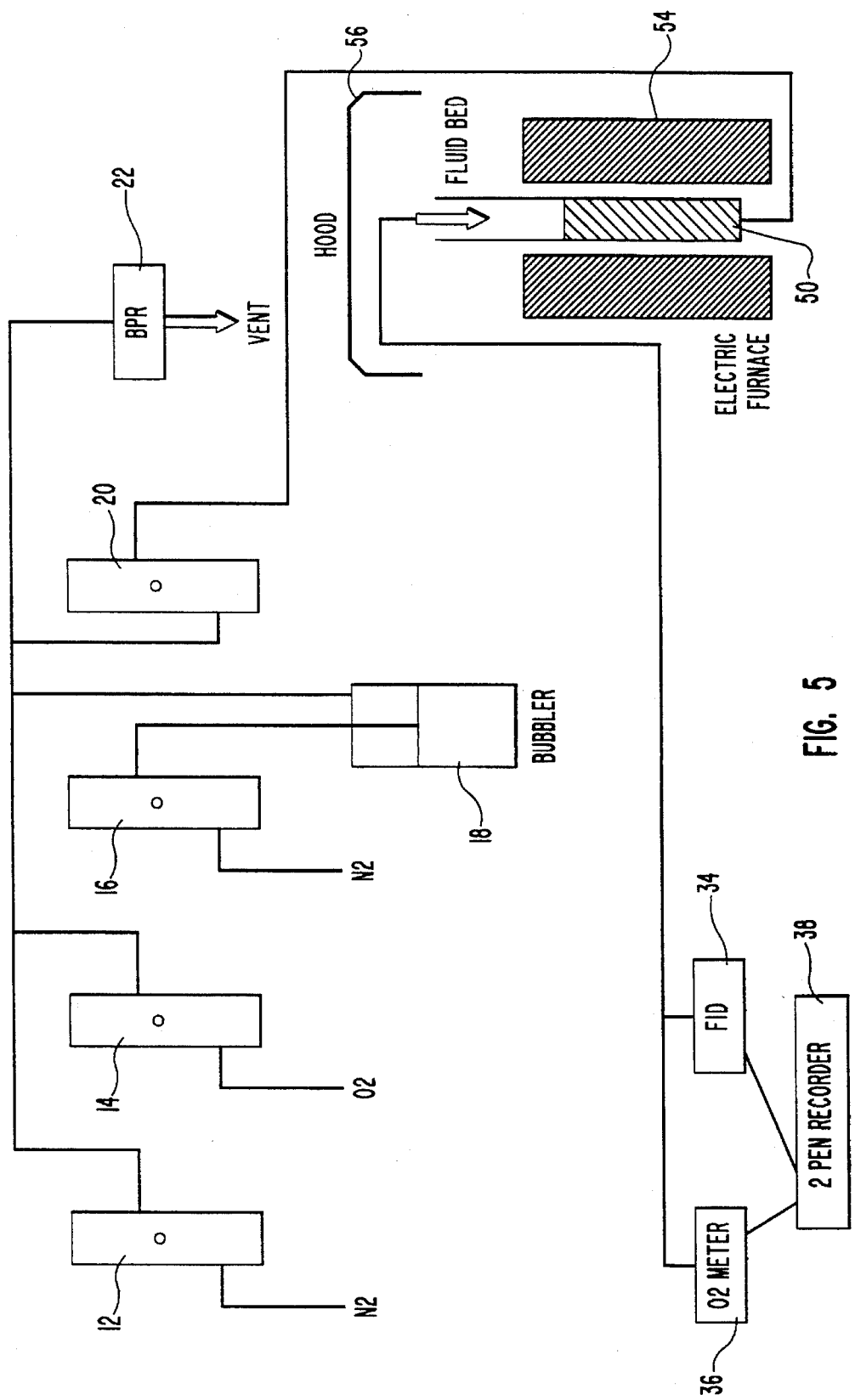
FIG. 5 illustrates an experimental setup using a fluid bed of reducible metal oxide to oxidize organic compounds.

The apparatus shown in FIG. 5 demonstrates, on a laboratory scale, a fluid bed embodiment within the scope of the present invention. The procedures used in conducting these experiments were similar to those used in Example 1, with the following exceptions.

First, a fluid bed 50 was housed in a 26 mm ID, 91 cm long quartz tube which was placed inside an electric furnace 54 with a 30 cm heated length. The fluid bed 50 had a settled height of 13 cm. It operated in a slugging mode with a height of 30 cm. Operation remained within the heated zone. Gases flowing out of the quartz tube went directly into a laboratory hood 56. Sample gas for the analytical instruments 34 and 36 was obtained by a probe. The material in fluid bed 50 was 16.8 wt % CuO supported on Alcoa type F-1 activated alumina, 28–48 mesh.

Table 2 lists the experimental conditions used in these fluid bed experiments and Table 3 shows the initial DREs which were achieved and the extent to which the bed's oxidation capacity could be used while maintaining the DRE above some predetermined value. Again, the results illustrate that the instant invention provides a highly effective method of preventing puffing both in terms of the initial DRE the puff receives and the size of the puff for which a high DRE can be maintained.

TABLE 2

| Run | R, the Organic being Oxidized | [R]i, input Concentration of the organic | T, °C. | Time |
|---|---|---|---|---|
| 10 | $C_6H_6$ | 8,000 ppmC | 806° C. | 0.75 sec. (Fluid) |
| 11 | $C_6H_5Cl$ | 3,900 ppmC | 805° C. | 0.75 sec. |

TABLE 2-continued

| Run | R, the Organic being Oxidized | [R]i, input Concentration of the organic | T, °C. | Time |
|---|---|---|---|---|
| | | | | (Fluid) |

TABLE 3

| Run | R, the Organic being Oxidized | Initial DRE | DRE as a function of Bed Oxidation Capacity, cc of air/cc of bed |
|---|---|---|---|
| 10 | $C_6H_6$ | >99.994% | 99.9% at CF = 43 |
| 11 | $C_6H_5Cl$ | >99.95 | 99.9% at CF = 169 |
| | | | 99.% at CF = 215 |

The bed which was used in the examples was a bed of copper oxide. Iron oxide may also be used. The reducible metal oxide may be used as the bulk metal with its surface oxidized, as the bulk oxide, or on a porous support. Among porous supports, alumina is preferred.

Although a fluid bed of 16.8 wt. % CuO was used in the experiment above described, the fluid bed may comprise greater than 10 wt. % CuO supported on alumina.

Example 4

Figure 6:
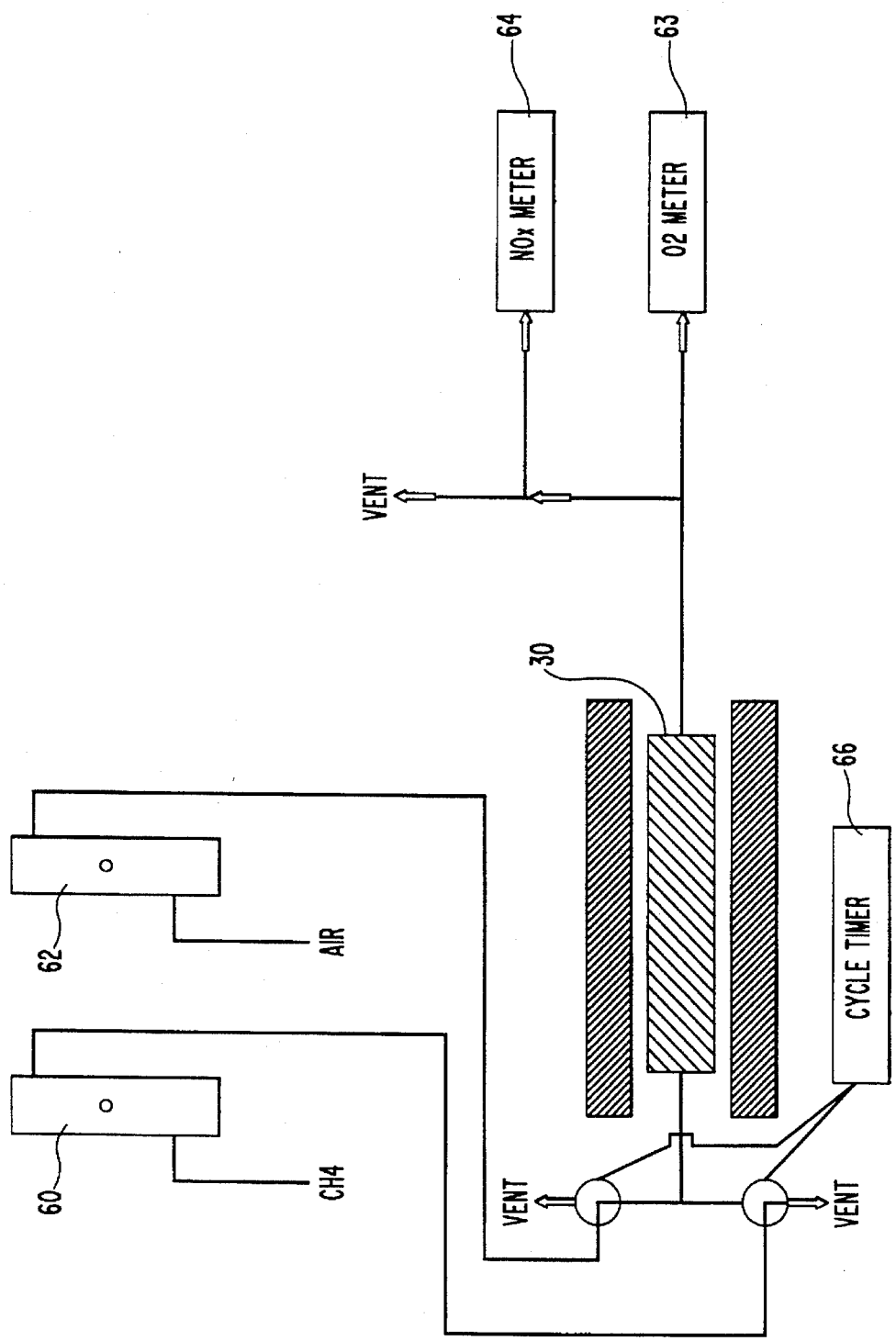
FIG. 6 illustrates an experimental setup for demonstrating that the CuO bed can be used repeatedly.

In order to demonstrate that the oxidizing means could be used to prevent a large number of puffs, an experiment was done with the setup shown in FIG. 6. As can be seen, a flow of methane was measured by a rotameter 60 and a flow of air was measured by a rotameter 62. The two flows were sent to the common inlets of two electrically activated three way valves. The use of three way valves allowed the flow through the rotameters to be continuous and hence more accurately measurable.

One of the flows was passed through the three way valve to vent while the other was passed through a 0.902 ID steel tube in an electrical furnace, the heated length of this tube having a volume of 160 cc and containing 87 grams of 25.5% copper oxide on alumina rings. An electrical cycle timer 66 was used to switch the three way valves at predetermined intervals.

Typically, the methane would pass through the bed for one second, then the air for 15 seconds, then the methane for one second, and so on. In this experiment it was observed that a bed of CuO was subjected to more than 5400 puffs of pure methane and showed no signs of mechanical deterioration or of its losing chemical activity.

Example 5

Experiments were done using the setup shown in FIG. 6 as an unmixed combustor, i.e., a combustor through which a fuel (methane) and air are alternately passed with little or no opportunity to mix.

Figure 7:
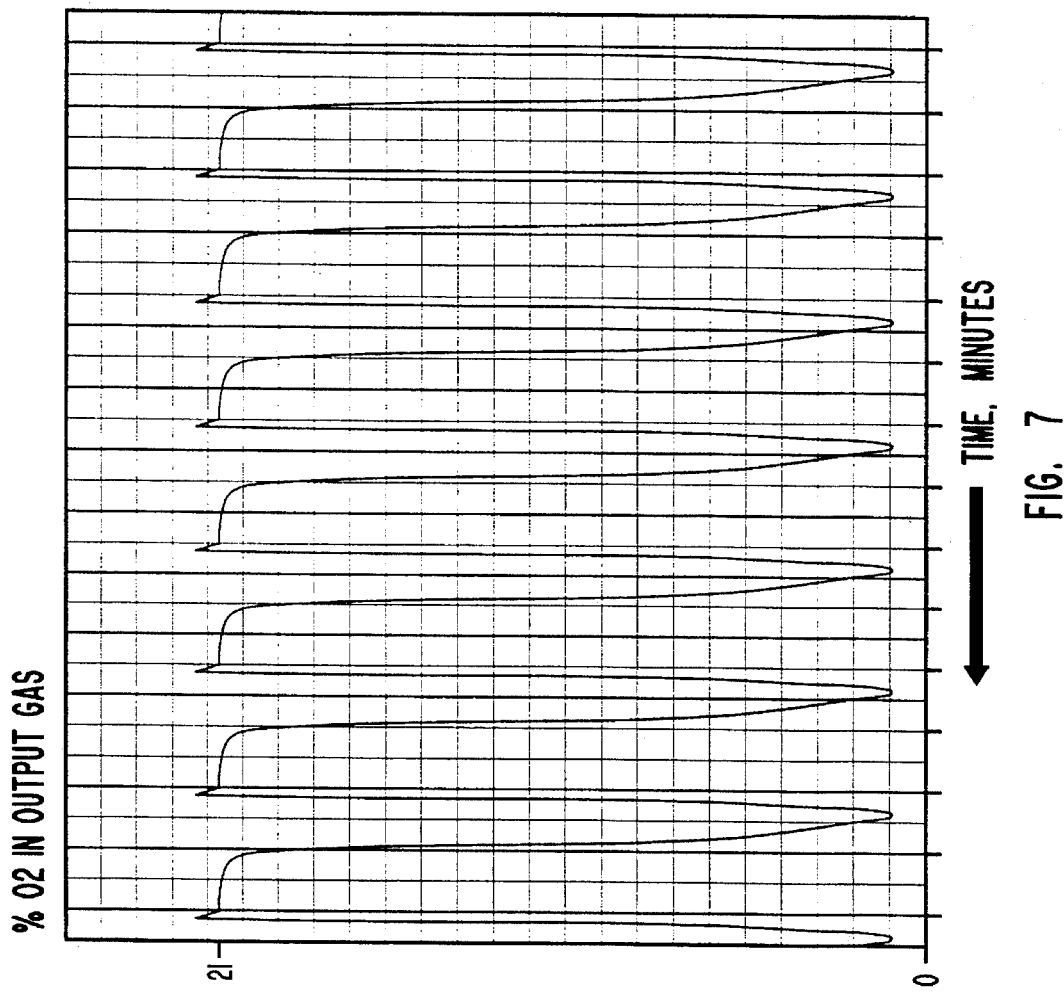
FIGS. 7 and 8, respectively, illustrate the effect of relatively long and short cycle time during unmixed combustion.

FIG. 7 illustrates the results of an experiment done with a cycle time of 120 seconds, i.e. with air flowing for 115 seconds and with $CH_4$ flowing for 5 seconds. FIG. 8 illustrates the results of a similar experiment with a shorter cycle time of 16 seconds, i.e. air flowing for 15 seconds and with $CH_4$ flowing for 1 second. During the part of the cycle in which air flows through the bed, the oxygen content of the gas coming out of the bed was found to be initially low, but later in the cycle was found to rise to that of the air going into the bed.

FIG. 8 illustrates the effect of shortening the cycle time and thereby decreasing the air to bed stoichiometric ratio so that it also is less than 1.0. Operating in this manner prevents extreme variation in the oxygen content of the post combustion gases but does not completely remove the cyclic variation in $O_2$ content. FIG. 8 also illustrates the measured $NO_x$ content of the post-combustion gases. It is to be recognized, however, that the catalyst used in these experiments was prepared with copper nitrate. The thermal decomposition of copper nitrate produces $NO_x$. If any trace of undecomposed copper nitrate remained in the catalyst its decomposition could contribute to the observed $NO_x$ production. Thus, while the $NO_x$ levels in FIG. 8 are a major advance over what could be achieved by means known in the prior art, they may not represent the lowest levels of $NO_x$ production that can be achieved by the present invention.

Figure 9:
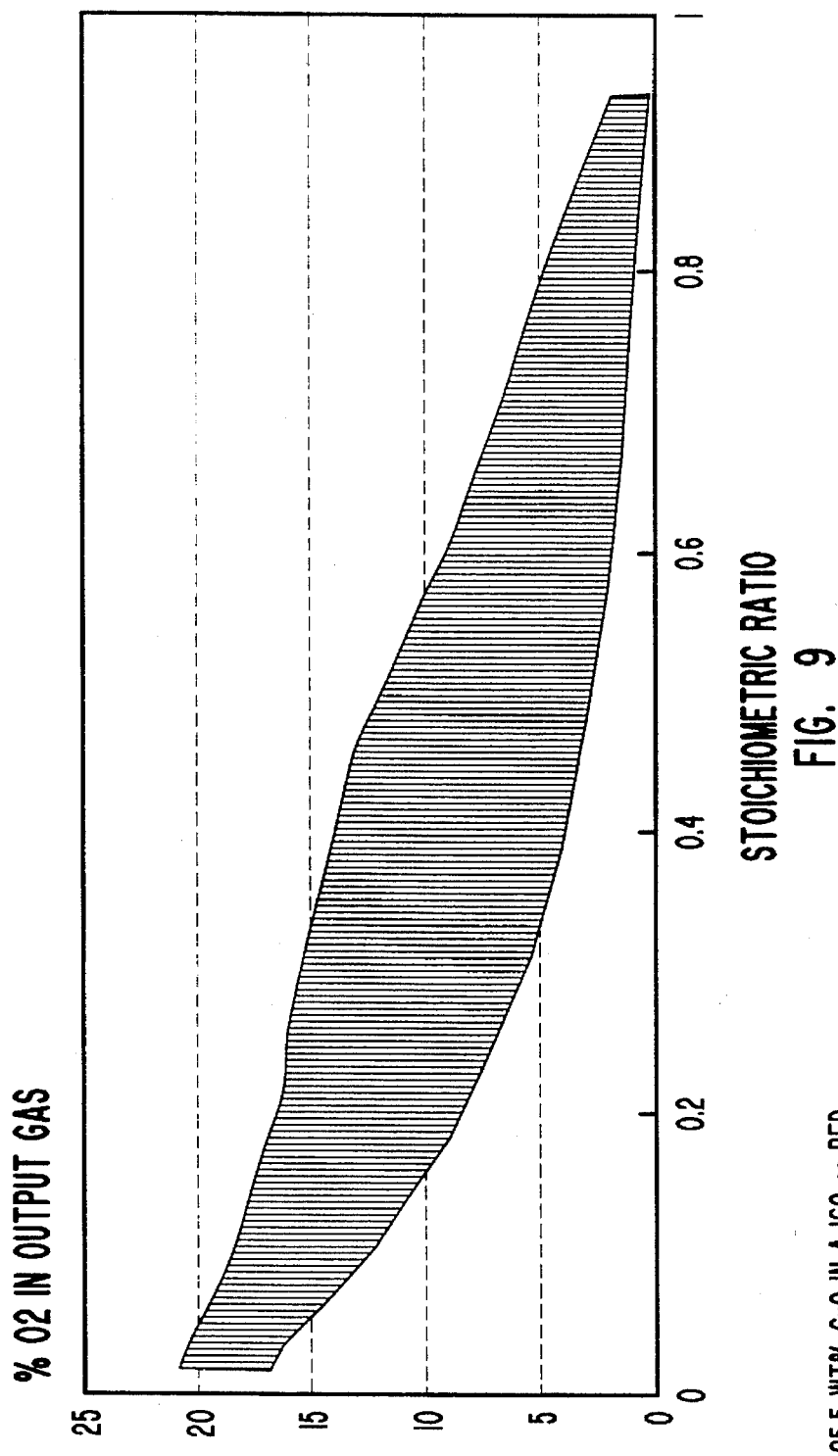
FIG. 9 illustrates the effect of varying the overall fuel to air stoichiometric ratio on the cyclic variation of the $O_2$ content of the post combustion gases.

FIG. 9 illustrates the effect of varying the overall fuel to air stoichiometric ratio on the cyclic variation of the $O_2$ content of the post-combustion gases.

In another experiment the electrical furnace was shut off and the combustor was allowed to operate autothermally with a $CH_4$ input of 3212 cc/min for 2 seconds, off for 15 seconds, and an air input of 3000 cc/min for 15 seconds, off for 2 seconds. Initially the bed temperature in this experiment was 775° C. After dropping to 635° C. the bed temperature wandered, slowly rising to 681° C. At 2.8 hours after shutting off the electric furnace the run was voluntarily terminated.

Example 6

Figure 10:
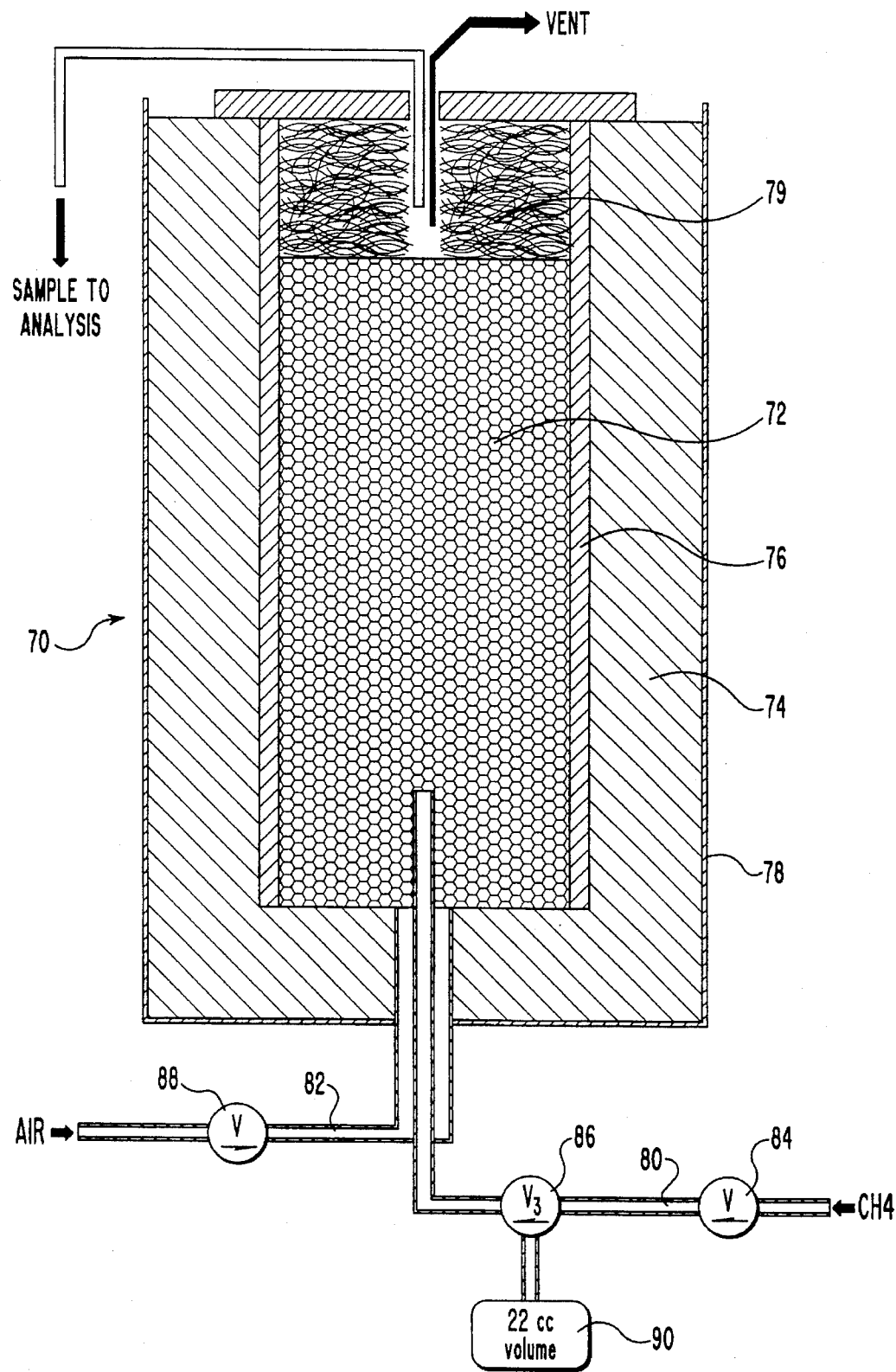
FIG. 10 illustrates an experimental setup for demonstrating that an unmixed combustion system can operate at instantaneous thermal powers of up to 2 kilowatts.

FIG. 10 shows a 2 KW prototype unmixed combustor 70 which was used to study the operational characteristics of unmixed combustion. The catalyst used in this set of experiments was prepared by impregnating alumina spheres, ⅛ to ¼ inch in diameter, with a solution of copper sulfate which was heated to decompose the copper sulfate to CuO, producing a catalyst that was roughly 32.6 wt % CuO.

Two type K thermocouples not shown in FIG. 10 were used to monitor the temperature near the center and near the edge of a catalyst bed 72, with bed 72 being 3 inches in diameter and 10 inches deep. The bulk density of catalyst bed 72 was 0.95 grams/cc. An 1100 watt electric heater 76 was disposed around catalyst bed 72, and a layer of alundum cement 74 that was 1.5 inches thick surrounded electric heater 76. A steel container 78 surrounded the outside of alundum cement 74. A layer of quartz wool insulator 79 surrounded the outlet from catalyst bed 72.

At the start of an experiment, catalyst bed 72 was brought to temperature by electric heater 76. Once combustor 70 reached temperature, electric heater 76 was unplugged and alternating flows of methane and air were sent through catalyst bed 72 via a gas line 80, having a two-way solenoid valve 84 and a three-way solenoid valve 86, and an air line 82 having a two-way solenoid valve 88. At this point in the experiment a temperature controller and a fourth type K thermocouple were used to control the bed's temperature, i.e. the fourth thermocouple was monitored by a temperature controller which turned on and off valve 84 in gas line 80 to the methane supply. Thus, when catalyst bed 72 was below its setpoint temperature, the two-way and three-way solenoid valves 84, 86, and 88 sent alternating pulses of air and methane through catalyst bed 72. When catalyst bed 72 was above its setpoint temperature, valve 88 in air line 82 still sent pulses of air through catalyst bed 72, but three-way valve 86 did not send methane.

The results of these experiments are shown in Table 3 below. Two ways in which this experiment was different from the experiment shown in Example 5 are to be noted. First, thanks to the use of copper sulfate rather than copper nitrate in the catalyst preparation, extremely low levels of $NO_x$ production have been achieved, i.e. the amount of $NO_x$ produced is zero within the sensitivity of the instrument used. Second, in Example 5 for part of the cycle the flow of methane was off and for part it was at some steady value. In the experiments of Example 6, the cycle begins with the rapid discharge of methane from a 22 cc calibrated volume container 90 into combustor 70. For the rest of that part of the cycle the methane is in contact with the unmixed combustion catalyst and can react. When the air half of the cycle begins, the reacted methane is swept out by air and catalyst bed 72 is reoxidized. The arrangement used in Example 6 thus is advantageous in that it gives the methane or other fuel more time in which to react with the unmixed combustion catalyst.

TABLE 3

| UNMIXED COMBUSTION IN A 2 KW PROTOTYPE COMBUSTOR Cycle time = Air on 1 sec./air off 1 sec Bed Temperature, set Point = 830° C. | | | | | |
|---|---|---|---|---|---|
| Power, watts = | 340 | 680 | 680 | 1360 | 2040 |
| Power density, = megawatts/M³ | 0.29 | 0.59 | 0.59 | 1.17 | 1.76 |
| Overall S.R. = | 0.4222 | 0.516 | 0.289 | 0.427 | 0.496 |
| CO, ppm = | 4 | 1.33 | 1.1 | 5.5 | 9 |
| $NO_x$, ppm = | 0 | 0 | 0 | 0 | 0+ |
| Uncertainty of measured $NO_x$ level, ppm | 0.03 | 0.03 | 0.03 | 0.03 | 0.03 |

Example 7

Figure 13:
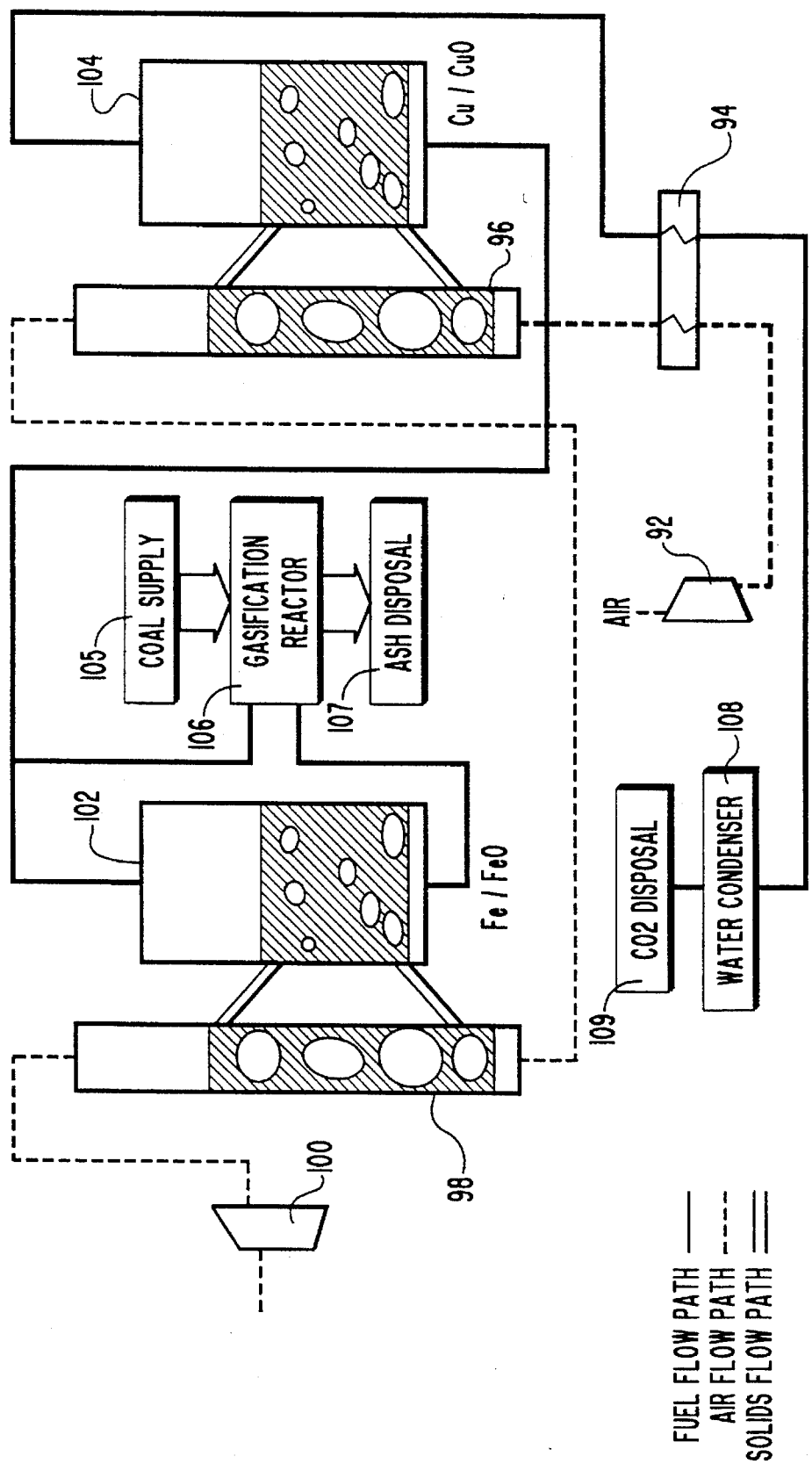
FIG. 13 shows a design for the use of a pair of unmixed combustors for the pollution free combustion of coal with enhanced energy efficiency.

FIG. 13 shows an example design for a gas turbine combustor using unmixed combustion. In this example, air is compressed in an air compressor 92 and then initially heated by passage through a heat exchange 94. The compressed air then passes through fluid bed 96 where the air oxidizes copper to copper oxide and the air is further heated by this reaction. The compressed air then passes through high temperature fluid bed 98 where the air oxidizes iron to iron oxide and the air is further heated by this reaction. The extremely hot oxygen depleted air then goes through turboexpander 100, thereby producing power. Solids circulate between high temperature fluid bed 98 and high temperature fluid bed reactor 102, and between fluid bed 96 and fluid bed reactor 104.

Gas is circulated between coal gasification reactor 106 and high temperature fluid bed reactor 102. For this example it is assumed that the system operates at 10 atmospheres pressure. A coal supply 105 feeds coal to gasification reactor 106 and contains 33.7 wt % moisture, 12.3 wt % ash, 42.5 wt. % C, 6.8 wt % H, and 2.06 wt % S. The ash leaving gasification reactor 106 to ash disposal 107 is free of moisture, carbon, hydrogen, and sulfur. The CO and $H_2$ in the gases coming out of gasification reactor 106 reduce the iron oxide in high temperature fluid bed reactor 102 to iron and are converted to $CO_2$ and water vapor. The $CO_2$ and water vapor in turn are reduced to CO and $H_2$ in gasification reactor 106. The excess gases produced in this cycle go to fluid bed reactor 104 where any CO and $H_2$ they contain are oxidized to $CO_2$ and water vapor. The $CO_2$ and water vapor then go through heat exchange 94 and a water condenser 108 for removal of the water vapor. At this point the gases consist almost entirely of $CO_2$ and can conveniently be disposed of in $CO_2$ disposal 109.

This design illustrates a number of advantages of the present invention. The gas going to water condenser 108 contains 39.9 mole % $CO_2$, 59.4 mole % water vapor, and 0.7 mole % $SO_2$. The dew point of water is then 159° C., a temperature high enough so that the useful recovery of the heat of vaporization of water vapor is entirely feasible. Water condenser 108 will remove other impurities in the combustion gases such as HCl, HF, and fine particles that contain heavy metals. The $CO_2$ leaving water condenser 108 will be at 10 atmospheres pressure which will greatly facilitate its disposal.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Patent is:

1. A method for safe disposal of chemical munitions, comprising the steps of:
    (a) introducing the chemical munitions into a heated chamber for explosion within the chamber, the chamber comprising:
        (i) means for adding the munitions to the chamber;
        (ii) means for harmlessly exploding the chemical munitions; and
        (iii) means for controlling the flow of gas through the chamber so that the gas leaves through a predetermined exit;
    (b) maintaining the temperature of the chamber at a level sufficient to cause the release of toxic chemicals from the chemical munitions;
    (c) connecting a bed of readily reducible metal oxide to the exit of the chamber; and
    (d) contacting the bed with an amount of air periodically to maintain the bed in an oxidized state, wherein the amount of air is adjusted with respect to the amounts of the toxic chemicals and other oxidizable materials exiting from the chamber, such that on an average over time, the total amount of oxygen passing through the bed of readily reducible metal oxide is at least sufficient for complete oxidation of the oxidizable materials.

2. The method of claim 1, wherein the bed of readily reducible metal oxide is selected from the group consisting of oxides of silver, copper, iron, cobalt, nickel, tungsten, manganese, molybdenum, and mixtures thereof, supported on alumina.

3. The method of claim 1, wherein the bed of readily reducible metal oxide a bed of copper oxide supported on alumina.

4. A system for safe disposal of chemical munitions, comprising:
    (a) a heated chamber for explosion of chemical munitions within the chamber, the chamber comprising:
        (i) means for adding the munitions to the chamber;
        (ii) means for harmlessly exploding the chemical munitions; and
        (iii) means for controlling the flow of gas through the chamber so that the gas leaves through a predetermined exit;
    (b) means for maintaining the temperature of the chamber at a level sufficient to cause the release of toxic chemicals from the chemical munitions;
    (c) a bed of readily reducible metal oxide connected to the exit of the chamber; and
    (d) means for contacting the bed with an amount of air periodically to maintain the bed in an oxidized state, the amount of air adjusted with respect to the amount of the toxic chemicals and other oxidizable materials exiting from the chamber, such that on an average over time, the total amount of oxygen passing through the bed of readily reducible metal oxide is at least sufficient for complete oxidation of the oxidizable materials.

5. A method for safe disposal of explosives and other energetic materials comprising the steps of:
    (a) providing an incinerator comprising:
        (i) a heated chamber for harmlessly exploding energetic materials having therein means for controlling the path by which gases produced in the chamber flow thereout;
        (ii) means for reducing $NO_x$; and
        (iii) a bed of readily reducible metal oxide positioned downstream of the $NO_x$ reducing means;
    (b) introducing the energetic materials into the heated chamber;
    (c) maintaining the temperature of the heated chamber at a level sufficient to cause the reaction of the energetic materials;
    (d) flowing the gases produced by the reaction of the energetic materials through the $NO_x$ reducing means;
    (e) adding air downstream of the $NO_x$ reducing means; and
    (f) flowing the gases through the bed of readily reducible metal oxide so that the gases are oxidized.

6. The method of claim 5, wherein the step of adding air downstream of the $NO_x$ reducing means is performed at a rate adjusted with respect to the amounts of CO and other reducing gases flowing into the bed of readily reducible metal oxide, such that on an average over time, the total amount of oxygen passing through the bed is at least sufficient for complete oxidation of the reducing gases.

7. The method of claim 5, wherein the bed of readily reducible metal oxide is selected from the group consisting of oxides of silver, copper, iron, cobalt, nickel, tungsten, manganese, molybdenum, and mixtures thereof, supported on alumina.

8. The method of claim 5, wherein the bed of readily reducible metal oxide comprises a bed of copper oxide supported on alumina.

9. A method of burning fuel in a combustion system, comprising the steps of:
    (a) providing a combustion device in which fuel and air are largely maintained unmixed before, during, and after combustion, such that mixing of the fuel and the air before, during, and after combustion is largely avoided, the combustion device comprising oxidizing means for supplying a reducible metal oxide so as to provide a reservoir of oxygen to oxidize the fuel;
    (b) contacting an amount of the fuel and an amount of the air alternately with the oxidizing means, the amount of the fuel being less than that which would be required to completely reduce the metal oxide to metal, and the amount of the air being at least sufficient for complete oxidation of the amount of the fuel: and (c) recovering an acid gas selected from the group consisting of $SO_x$, HCl, and HF.

10. The method of claim 9, further comprising the step of recovering vaporized metals selected from the group consisting of mercury, lead, arsenic, antimony, bismuth, and cadmium.

11. The method of claim 9, further comprising the step of recovering the heat vaporization of water vapor.

12. A method for generating heat and for producing an inert gas comprising nitrogen, comprising the steps of:

(a) providing a bed of a readily reducible metal oxide;

(b) contacting an amount of fuel and an amount of air alternately with the bed in cycles, the ratio of the amount of fuel to the amount of air being contacted during each cycle being greater than that which would be required for stoichiometric combustion, and the amount of the air which is contacted during each cycle being less than sufficient for complete oxidation of the readily reducible metal oxide, wherein the contacting of the air with the bed produces nitrogen and the contacting of the fuel with the bed produces a gas, said contacting of fuel and air with the bed being done in such a manner that the fuel and the air undergo little or no mixing before, during, or after their contacting with the bed;

(c) contacting the gas produced by passage of fuel through the bed with additional air such that the gas is completely oxidized;

d) recovering the nitrogen produced by the passage of air through the bed; and (e) recovering the heat produced by the passage of the air and the fuel through the bed.

13. The method of claim 12, wherein the metal oxide is copper oxide supported on alumina, and the temperature of the bed is in the range of about 500° C. to 1000° C.

14. A system for safe disposal of explosives and other energetic materials, comprising:

(a) an incinerator comprising:
  (i) a heated chamber for harmlessly exploding energetic materials having therein means for controlling the path by which gases produced in the chamber flow thereout;
  (ii) means for reducing $NO_x$; and
  (iii) a bed of readily reducible metal oxide positioned downstream of the $NO_x$ reducing means;

(b) means for introducing the energetic materials into the heated chamber;

(c) means for maintaining the temperature of the heated chamber at a level sufficient to cause the reaction of the energetic materials;

(d) means for flowing the gases produced by the reaction of the energetic materials through the $NO_x$ reducing means;

(e) means for adding air downstream of the $NO_x$ reducing means; and (f) means for flowing the gases through the bed of readily reducible metal oxide such that the gases are oxidized.

* * * * *

UNITED STATES PATENT AND TRADEMARK OFFICE
CERTIFICATE OF CORRECTION

PATENT NO. : 5,509,362
DATED : April 23, 1996
INVENTOR(S) : Richard K. Lyon

It is certified that error appears in the above-identified patent and that said Letters Patent is hereby corrected as shown below:

Column 1, line 6, "pan" should be --part--.
Column 2, line 59, "temps" should be --terms--.
Column 3, line 16, "pans" should be --parts--.
Column 3, line 25, "pans" should be --parts--.
Column 5, line 46, "other" should be --others--.
Column 8, line 15, "$SO_2\ CO_2$" should be --$SO_2$, $CO_2$--.
Column 8, line 61, "oft he" should be --of the--.
Column 13, line 43, "watts/cm2/ C" should be --watts/$cm^2$/ C).--.
Column 15, line 10, "duc" should be --due--.
Column 18, line 13, "Alteratively" should be --Alternatively--.
Column 28, line 56, "example" should be --example,--.
Column 29, line 9, "oxide a bed" should be --oxide comprises a bed--.
Column 30, line 55, Entire Claim 9 should be Claim 10.
Column 31, Entire Claim 10 should be Claim 11.
Column 31, line 5, "of claim 9" should be of claim 10--.
Column 31, Entire Claim 11 should be Claim 12.
Column 31, line 9, "of claim 9" should be --of claim 10--.
Column 32, Entire Claim 12, should be Claim 13.

UNITED STATES PATENT AND TRADEMARK OFFICE
CERTIFICATE OF CORRECTION

PATENT NO. : 5,509,362
DATED : April 23, 1996
INVENTOR(S) : Richard K. Lyon

It is certified that error appears in the above-identified patent and that said Letters Patent is hereby corrected as shown below:

Column 32, Entire Claim 14 should be Claim 9
Column 32, Entire Claim 13 should be Claim 14.
Column 32, line 3, "of claim 12" should be --of claim 13--.

Signed and Sealed this

Fourteenth Day of April, 1998

Attest:

BRUCE LEHMAN

*Attesting Officer*　　　*Commissioner of Patents and Trademarks*